United States Patent
Sekula et al.

(10) Patent No.: US 10,010,744 B2
(45) Date of Patent: Jul. 3, 2018

(54) PIECE OF FITNESS EQUIPMENT

(71) Applicant: Airpressure Bodyforming GmbH, Berchtesgaden (DE)

(72) Inventors: Oliver Sekula, Berchtesgaden (DE); Hubert Greinwalder, München (DE); Gert Rechenmacher, Villach (AT)

(73) Assignee: AIRPRESSURE BODYFORMING GMBH, Berchtesgaden (DE)

( * ) Notice: Subject to any disclaimer, the term of this patent is extended or adjusted under 35 U.S.C. 154(b) by 0 days.

(21) Appl. No.: 14/764,963

(22) PCT Filed: Jan. 9, 2014

(86) PCT No.: PCT/EP2014/050323
§ 371 (c)(1),
(2) Date: Jul. 30, 2015

(87) PCT Pub. No.: WO2014/117986
PCT Pub. Date: Aug. 7, 2014

(65) Prior Publication Data
US 2016/0129298 A1    May 12, 2016

Related U.S. Application Data

(60) Provisional application No. 61/759,093, filed on Jan. 31, 2013.

(30) Foreign Application Priority Data

Jan. 31, 2013 (DE) .......................  10 2013 101 006

(51) Int. Cl.
*A63B 21/008* (2006.01)
*A63B 21/00* (2006.01)
(Continued)

(52) U.S. Cl.
CPC ....... *A63B 21/4025* (2015.10); *A61H 9/0078* (2013.01); *A61H 9/0092* (2013.01);
(Continued)

(58) Field of Classification Search
CPC ............ A63B 21/0085; A63B 21/4025; A61H 9/0078; A61H 9/0085; A61H 9/0092;
(Continued)

(56) References Cited

U.S. PATENT DOCUMENTS 3,523,301 A * 8/1970 Davis ..................... A62B 17/00
2/2.11
3,823,712 A * 7/1974 Morel ..................... A61F 5/012
128/DIG. 20
(Continued)

FOREIGN PATENT DOCUMENTS

EP    1248586 B1    3/2004
EP    1307168 B1    4/2005
(Continued)

OTHER PUBLICATIONS

PCT/EP2014/050314, International Search Report of the International Search Authority dated Jul. 15, 2014 (3 pages).
(Continued)

*Primary Examiner* — Joshua Lee
(74) *Attorney, Agent, or Firm* — Thomas B. Ryan; Harter Secrest & Emery LLP

(57) ABSTRACT

A piece of fitness equipment, which is suitable for fitting to a body part of a person comprising a pressure chamber to which a fluid can be applied and a pump that is connected with the pressure chamber and is suitable for applying the fluid to the pressure chamber. Furthermore, the device comprises a controller for controlling the pump and a wearable holder that is detachably connectable with the pressure chamber and serves for holding the pressure cham-
(Continued)

Figure 1:
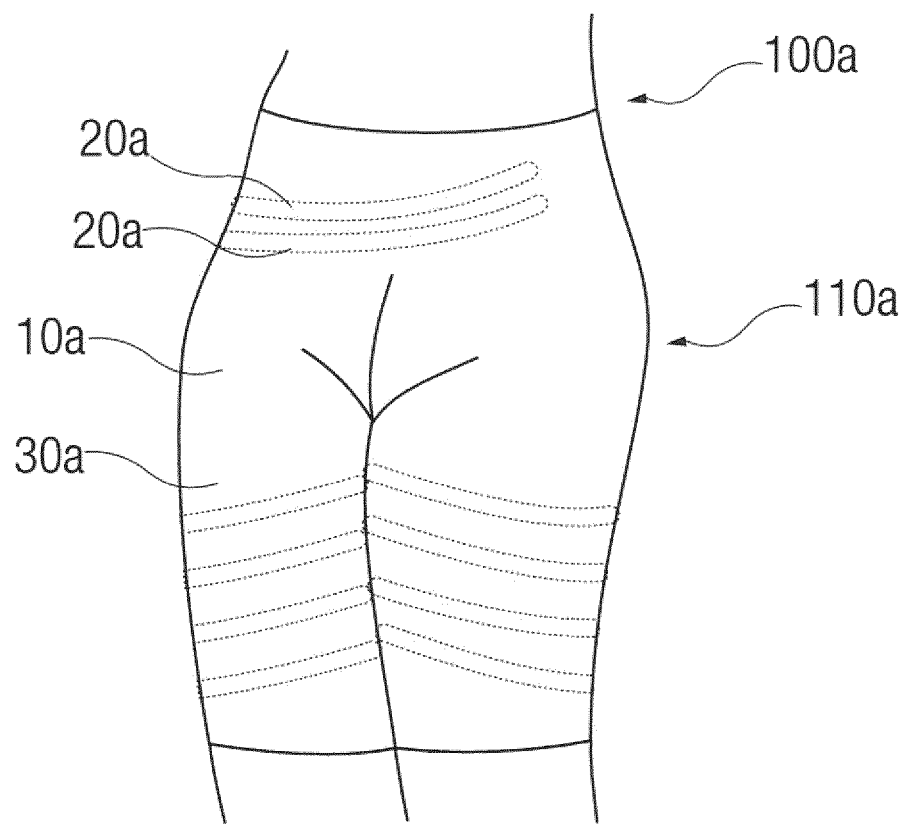

ber to the body part. The pressure chamber is formed in the shape of a hose.

12 Claims, 24 Drawing Sheets

(51) Int. Cl.
*A61H 9/00* (2006.01)
*H02J 7/00* (2006.01)
*A41C 1/00* (2006.01)

(52) U.S. Cl.
CPC ...... *A63B 21/0085* (2013.01); *A41B 2400/32* (2013.01); *A41B 2400/38* (2013.01); *A41C 1/00* (2013.01); *A41D 2400/32* (2013.01); *A41D 2400/38* (2013.01); *A61H 2201/165* (2013.01); *A61H 2201/1623* (2013.01); *A61H 2201/1628* (2013.01); *A61H 2205/00* (2013.01); *A61H 2205/08* (2013.01); *A61H 2205/083* (2013.01); *H02J 7/0042* (2013.01)

(58) Field of Classification Search
CPC .... A61H 2201/1623; A61H 2201/1628; A61H 2201/165; A61H 2205/00; A61H 2205/08; A61H 2205/083; A41C 1/00; A41B 2400/32; A41B 2400/38; A41D 2400/32; A41D 2400/38; H02J 7/0042
See application file for complete search history.

(56) References Cited

U.S. PATENT DOCUMENTS

| | | | | |
|---|---|---|---|---|
| 3,920,006 A | | 11/1975 | Lapidus | |
| 6,010,470 A | * | 1/2000 | Albery | A61H 9/0092 601/149 |
| 6,010,471 A | * | 1/2000 | Ben-Noon | A61F 5/05816 601/149 |
| 6,179,796 B1 | * | 1/2001 | Waldridge | A61H 9/0078 601/149 |
| 6,290,642 B1 | * | 9/2001 | Reinhard | B64D 10/00 600/20 |
| 6,757,916 B2 | * | 7/2004 | Mah | B64D 10/00 2/2.14 |
| 7,044,924 B1 | * | 5/2006 | Roth | A61H 9/0078 128/DIG. 20 |
| 7,077,794 B1 | * | 7/2006 | Bray | A41D 13/0525 482/111 |
| 7,135,007 B2 | * | 11/2006 | Scott | A61F 13/085 602/75 |
| 7,823,219 B2 | * | 11/2010 | Freund | A61F 13/143 2/69 |
| 7,871,387 B2 | * | 1/2011 | Tordella | A61F 5/34 128/DIG. 20 |
| 9,433,532 B2 | * | 9/2016 | Vess | A61H 9/0092 |
| 2002/0042583 A1 | * | 4/2002 | Barak | A61F 5/012 601/1 |
| 2002/0062515 A1 | * | 5/2002 | Wang | A41D 1/06 2/227 |
| 2003/0032904 A1 | | 2/2003 | Norbert | |
| 2003/0032905 A1 | * | 2/2003 | Waldridge | A61H 9/0078 601/152 |
| 2005/0070405 A1 | * | 3/2005 | Egger | A61H 9/005 482/78 |
| 2005/0187500 A1 | | 8/2005 | Perry et al. | |
| 2007/0135743 A1 | * | 6/2007 | Meyer | A61H 9/0078 601/152 |
| 2008/0222771 A1 | * | 9/2008 | Natonson | A61H 9/0078 2/102 |
| 2009/0255531 A1 | * | 10/2009 | Johnson | A61F 5/24 128/99.1 |
| 2010/0042026 A1 | * | 2/2010 | Kloecker | A61F 5/34 601/149 |
| 2010/0210981 A1 | | 8/2010 | Hofmann | |
| 2010/0210982 A1 | * | 8/2010 | Balachandran | A61F 7/0085 601/152 |
| 2010/0268130 A1 | * | 10/2010 | Khan | A61H 9/0078 601/46 |
| 2011/0143892 A1 | * | 6/2011 | Karecki | A63B 21/4025 482/111 |
| 2011/0288458 A1 | * | 11/2011 | Jones | A61H 9/0057 601/149 |
| 2012/0022416 A1 | | 1/2012 | Munoz | |
| 2012/0065561 A1 | * | 3/2012 | Ballas | A61H 9/0021 601/152 |
| 2012/0089059 A1 | * | 4/2012 | Olson | A61H 9/0078 601/152 |
| 2012/0094811 A1 | * | 4/2012 | Karecki | A63B 21/4025 482/121 |
| 2013/0035619 A1 | * | 2/2013 | Freund | A61H 9/0078 601/150 |
| 2013/0085431 A1 | * | 4/2013 | Malhi | A61H 9/0078 601/150 |
| 2013/0338552 A1 | * | 12/2013 | Malhi | A61H 23/04 601/150 |
| 2016/0166454 A1 | * | 6/2016 | Johnson | A63B 69/0064 280/1.5 |

FOREIGN PATENT DOCUMENTS

| | | |
|---|---|---|
| EP | 2168553 A1 | 3/2010 |
| WO | 2000072797 A1 | 12/2000 |
| WO | 2001052787 A2 | 1/2002 |
| WO | 2003030808 A1 | 4/2003 |
| WO | 2004084790 A1 | 10/2004 |
| WO | 2005016218 A1 | 2/2005 |
| WO | 2006033114 A2 | 3/2006 |
| WO | 20070137313 A1 | 12/2007 |

OTHER PUBLICATIONS

PCT/EP2014/050314, International Report on Patentability dated Aug. 4, 2015 (11 pages).
PCT/EP2014/050323, International Search Report of the International Searching Authority dated Jul. 23, 2014 (4 pages).
PCT/EP2014/050323, International Preliminary Report on Patentability dated Aug. 4, 2015 (English translation, 12 pages).

* cited by examiner

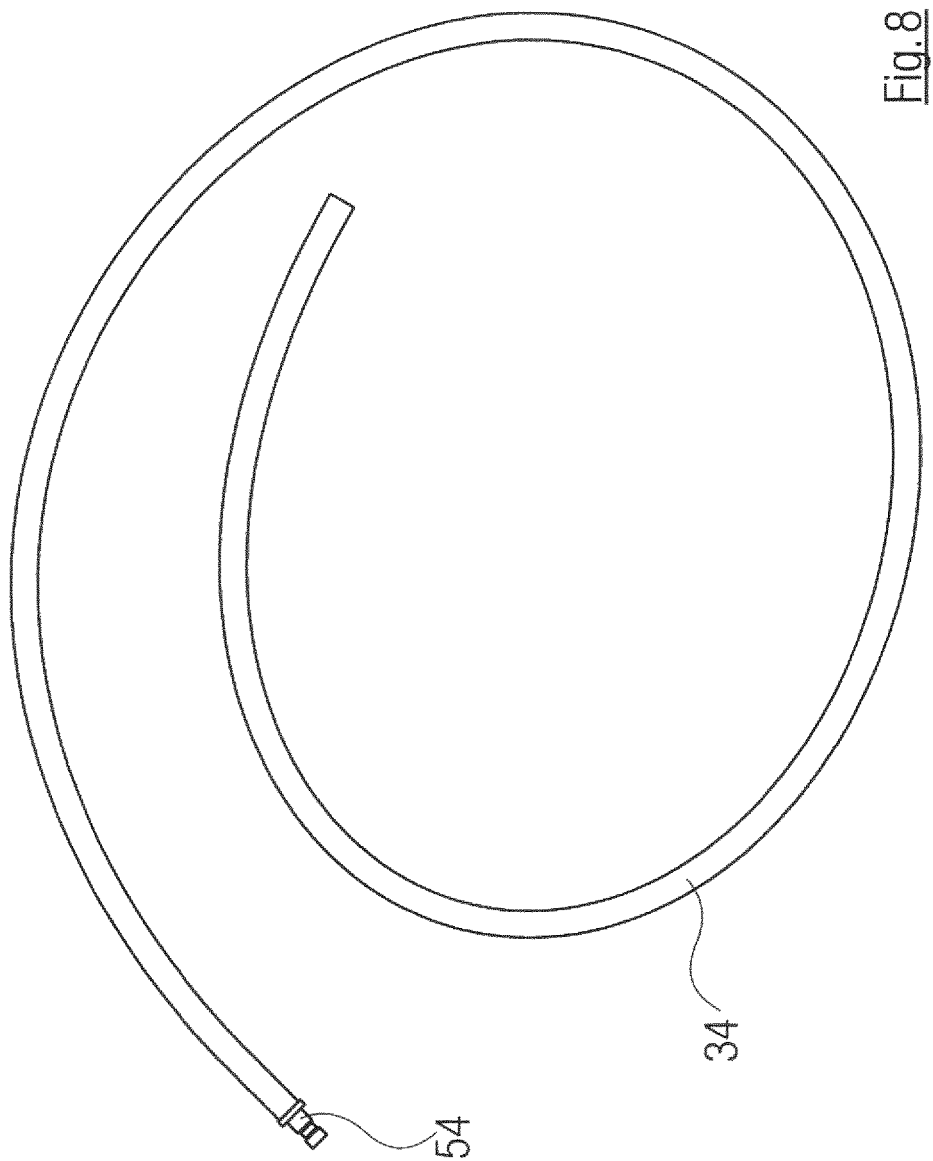

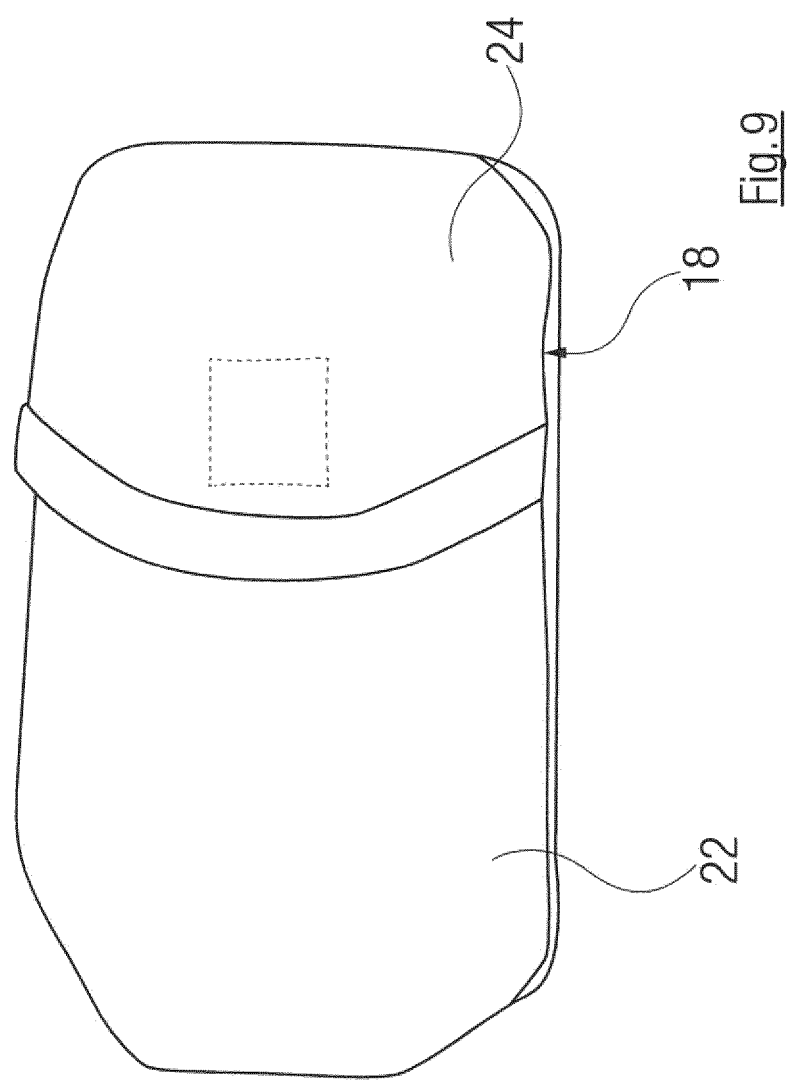

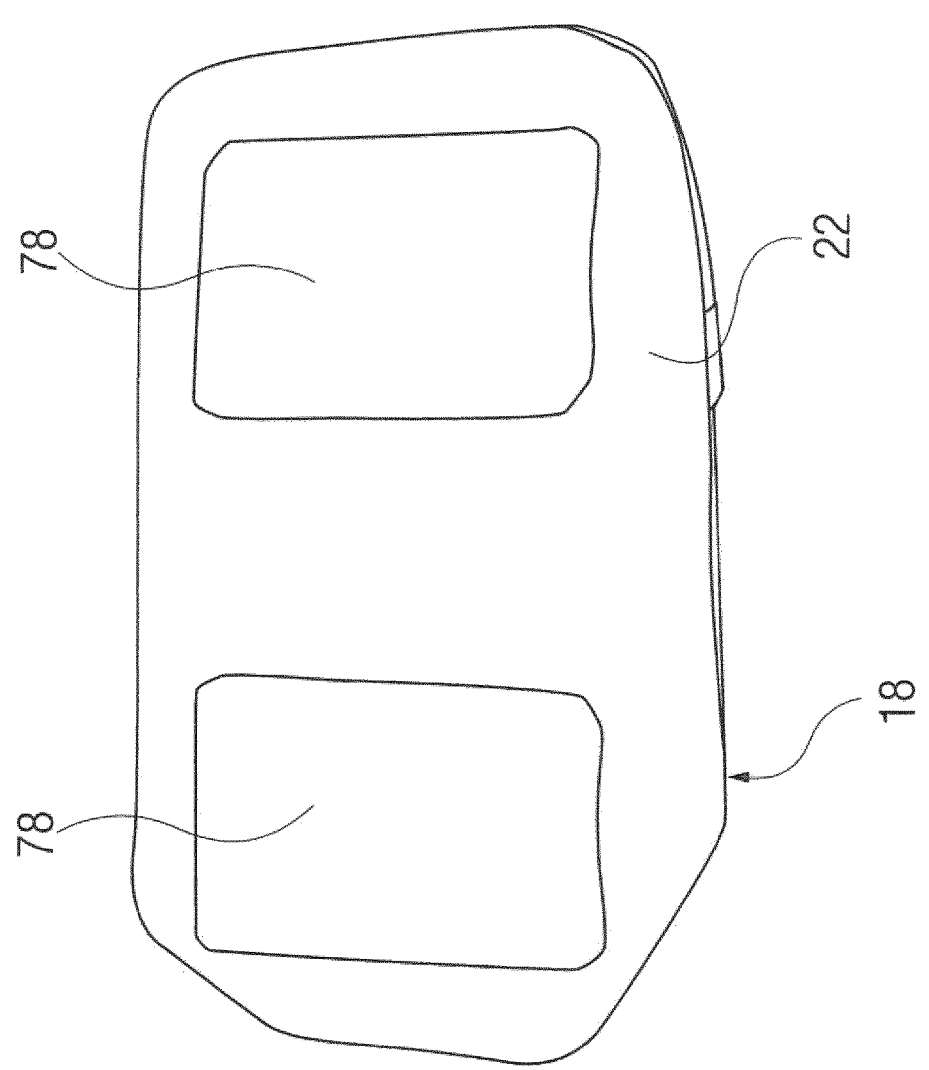

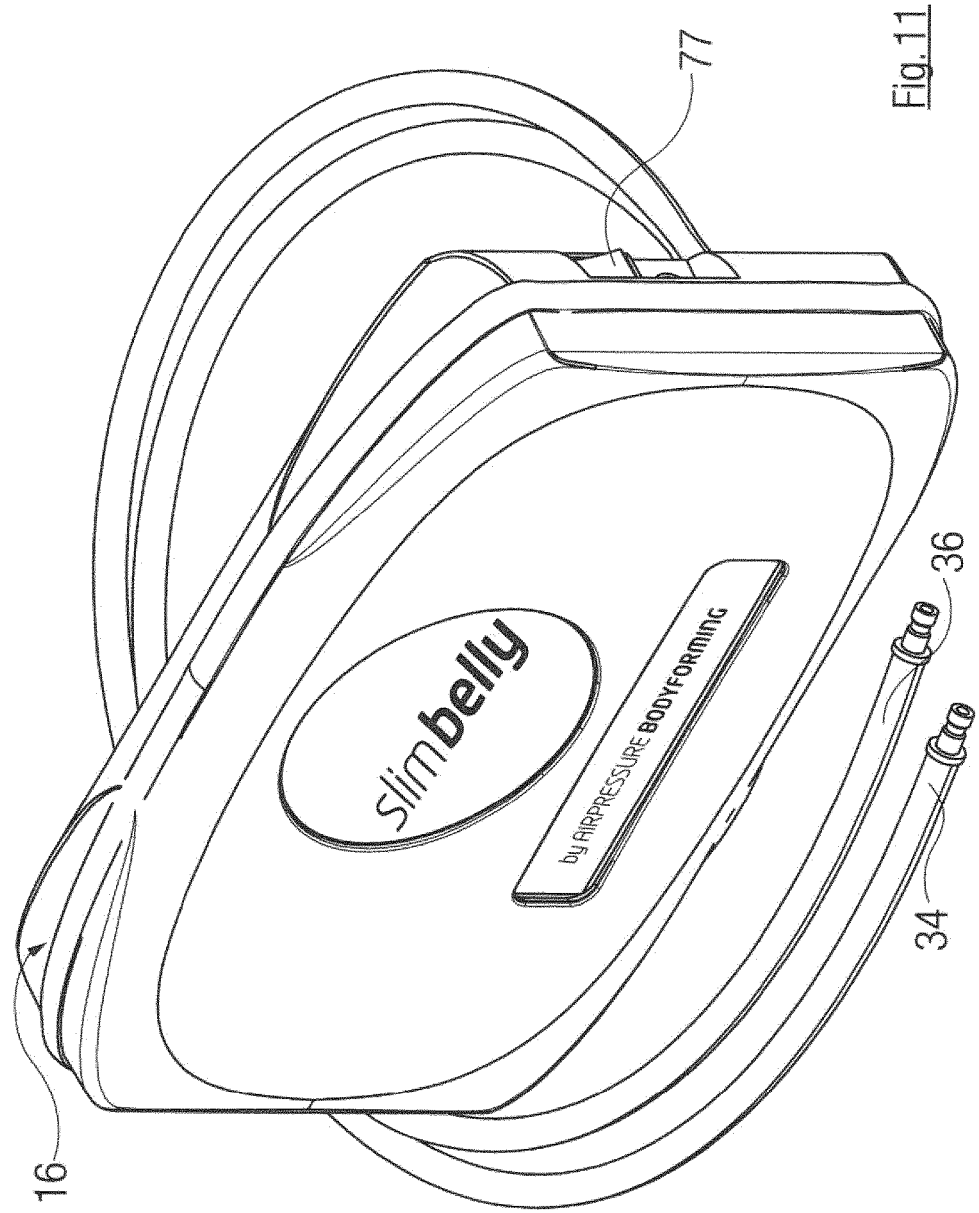

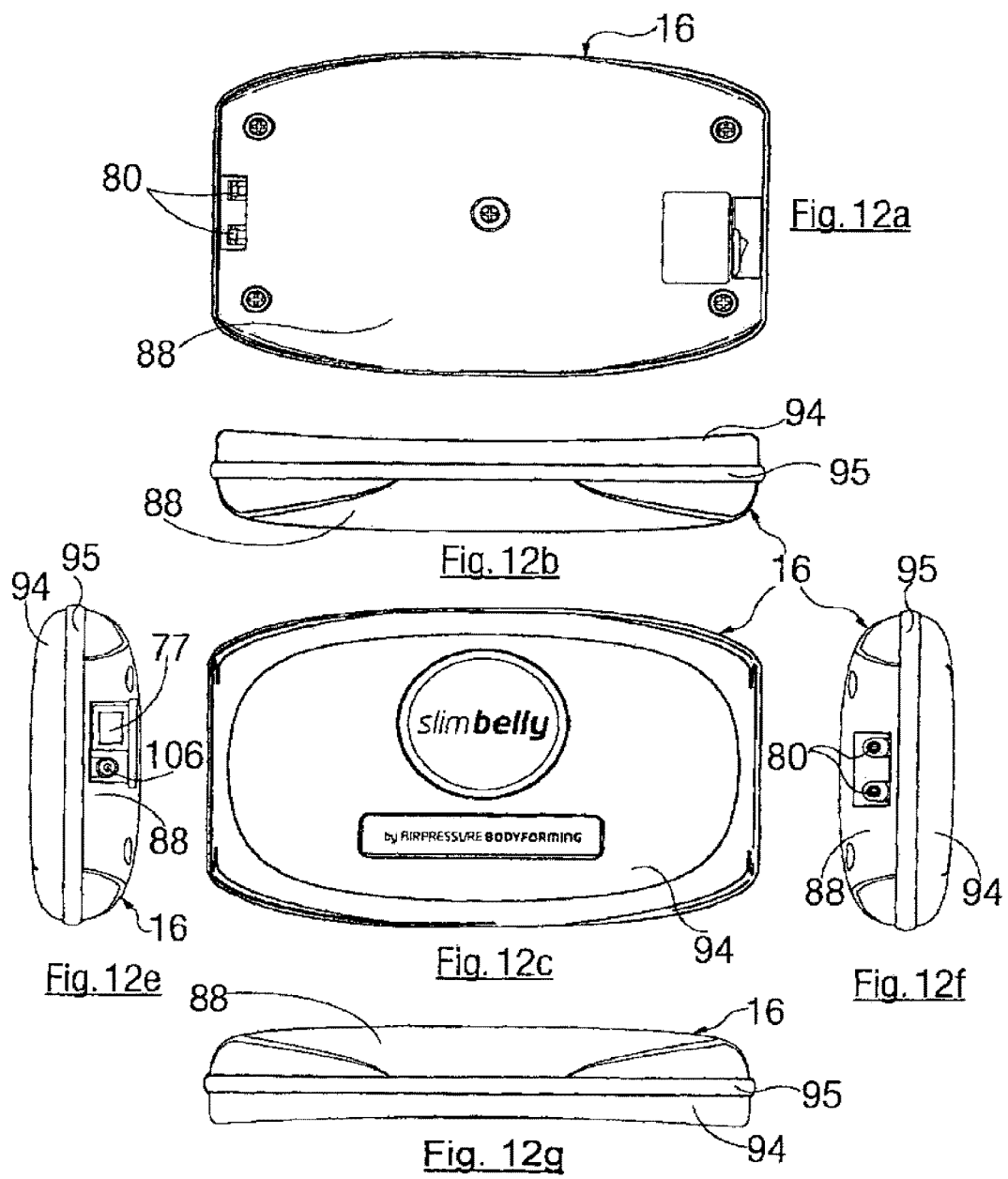

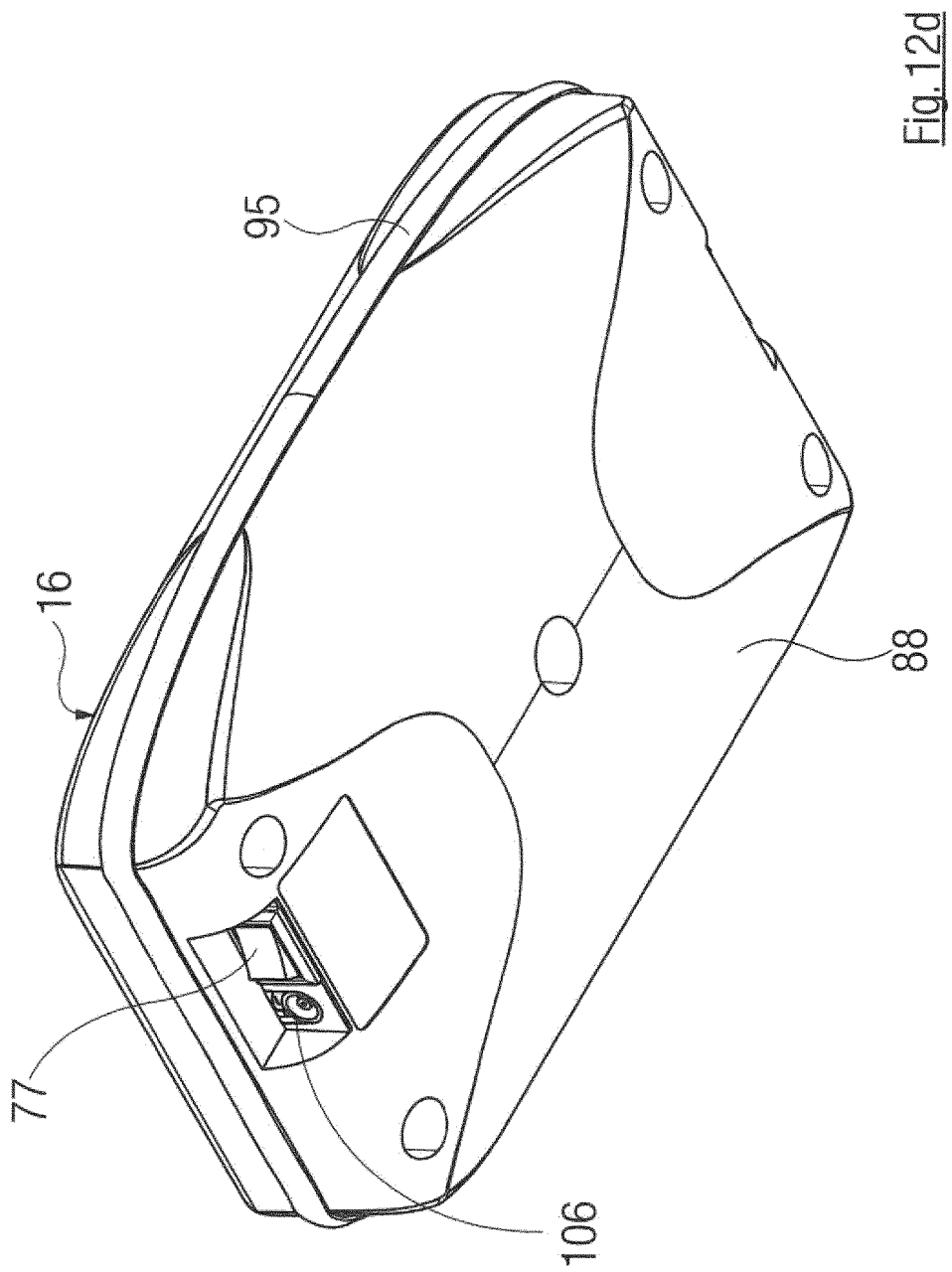

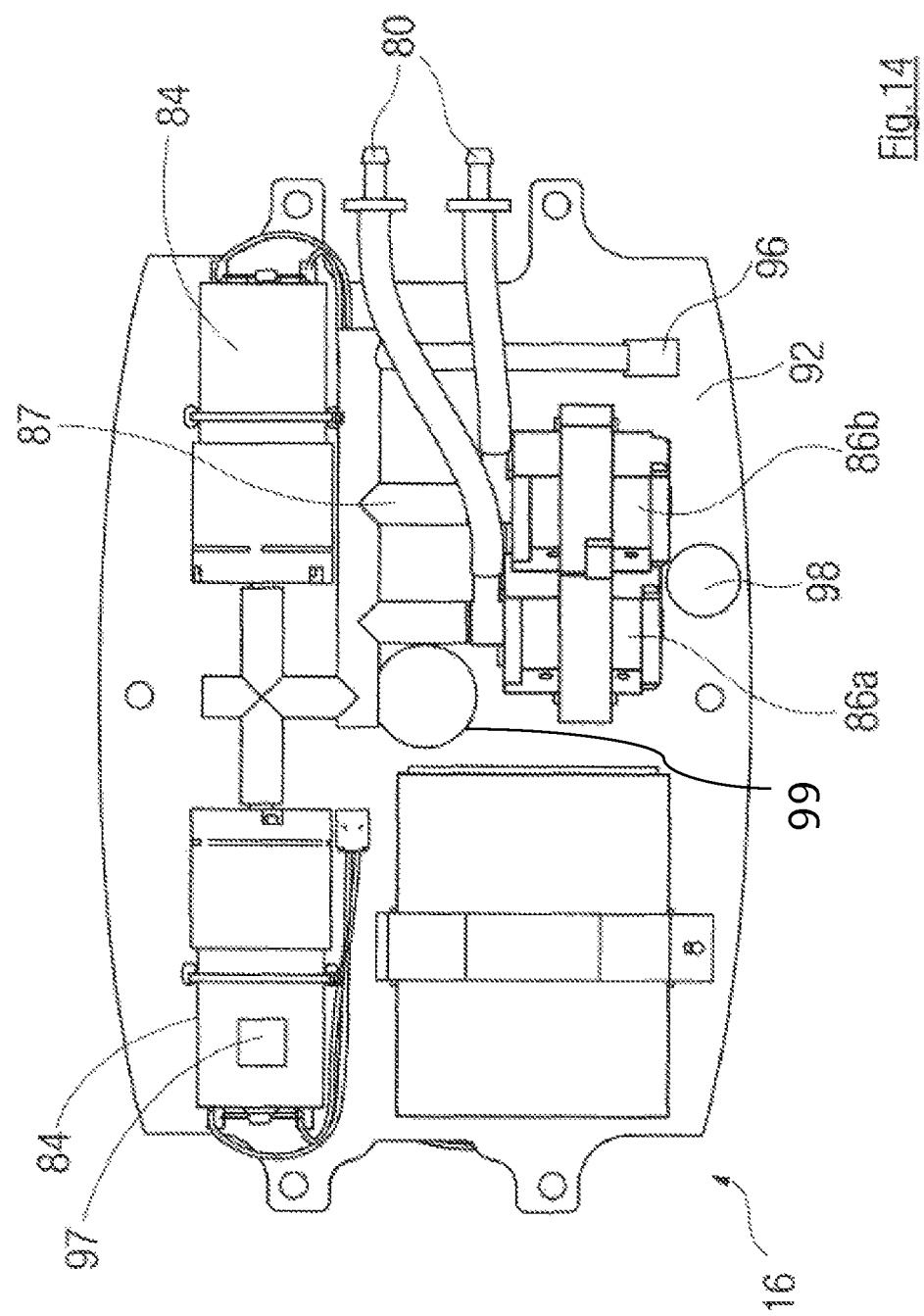

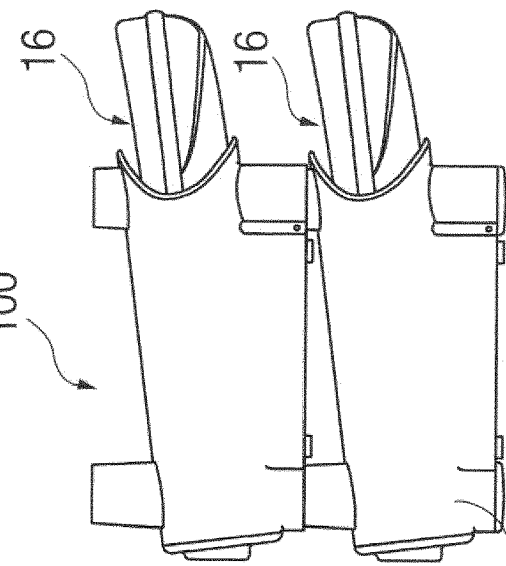
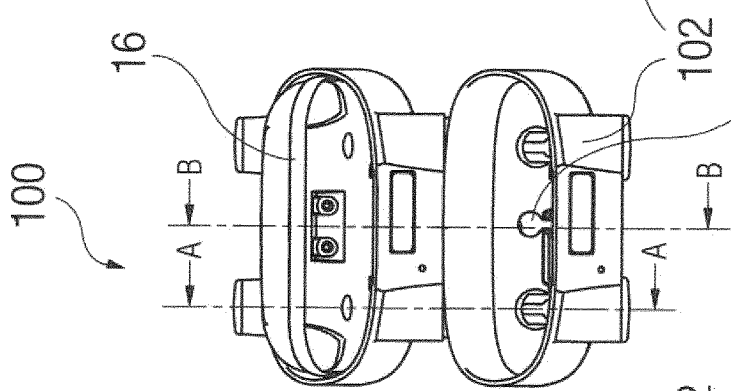
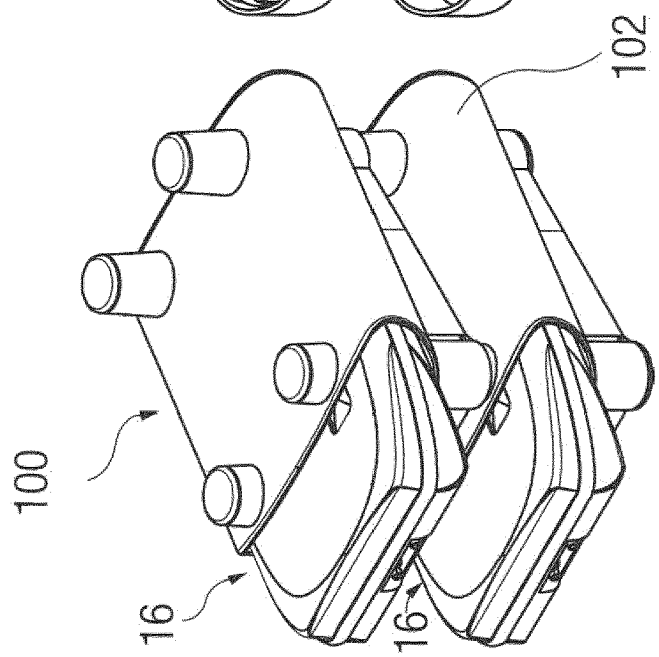
Fig.15c
Fig.15a
Fig.15b

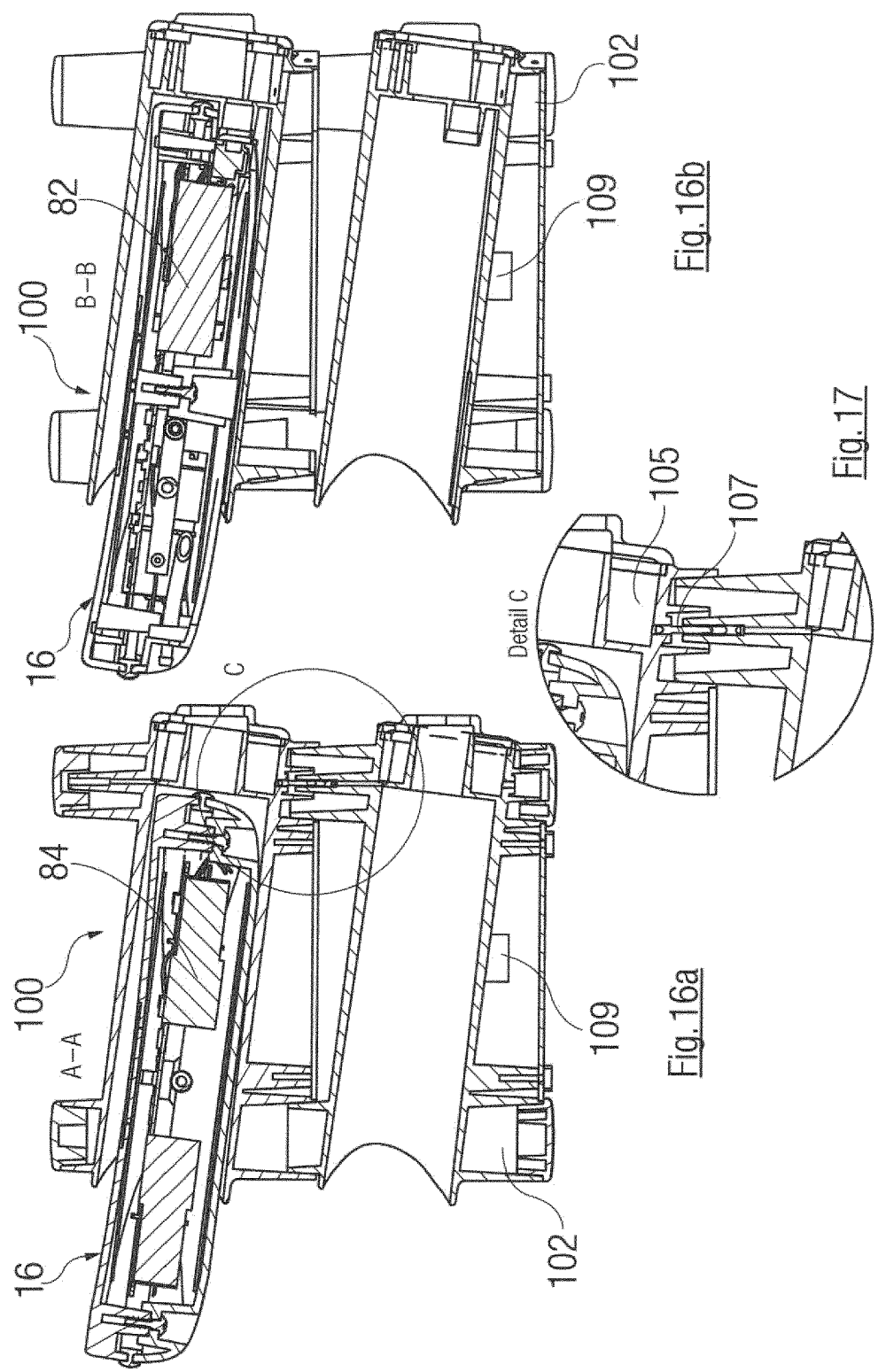

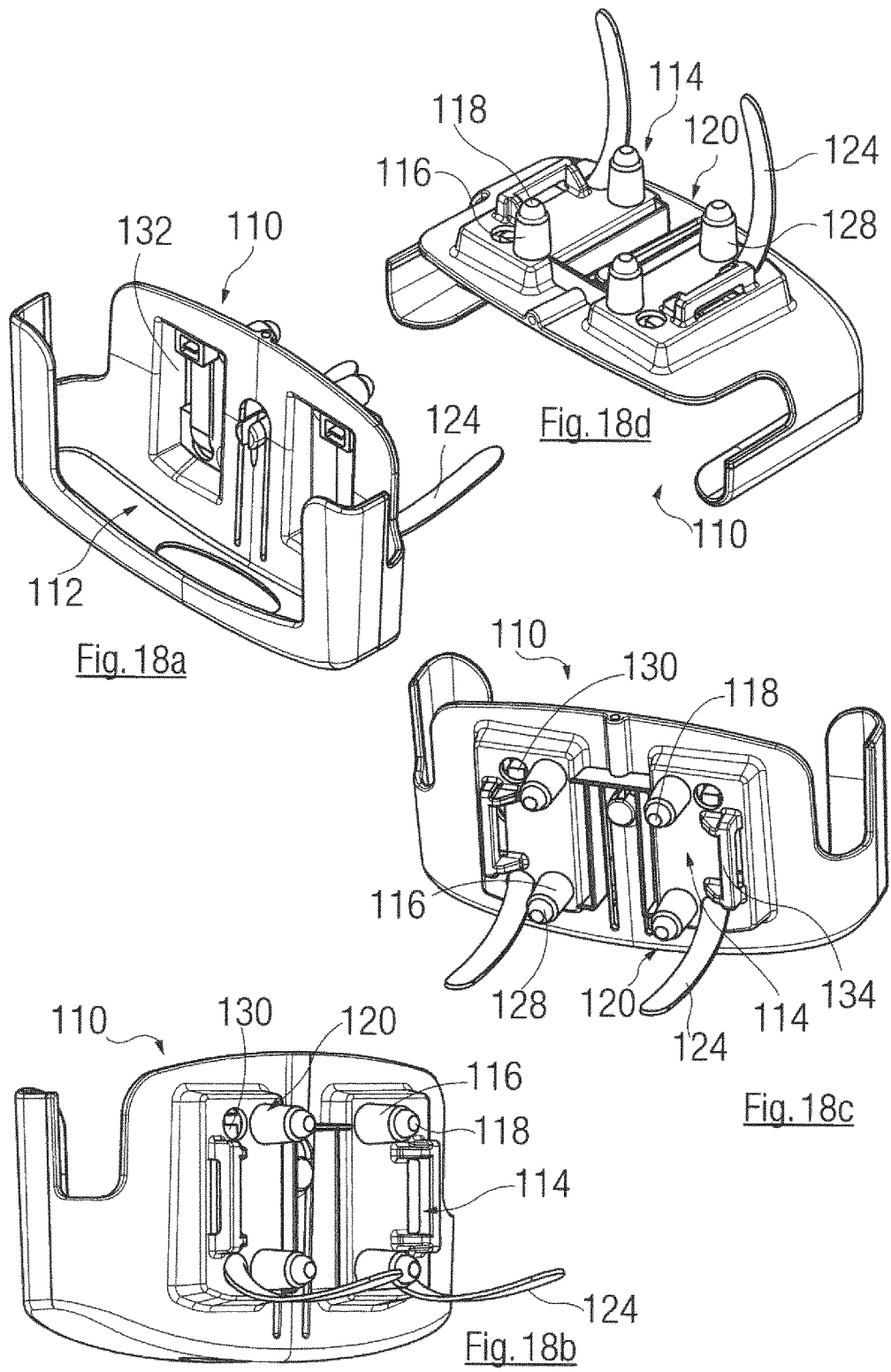

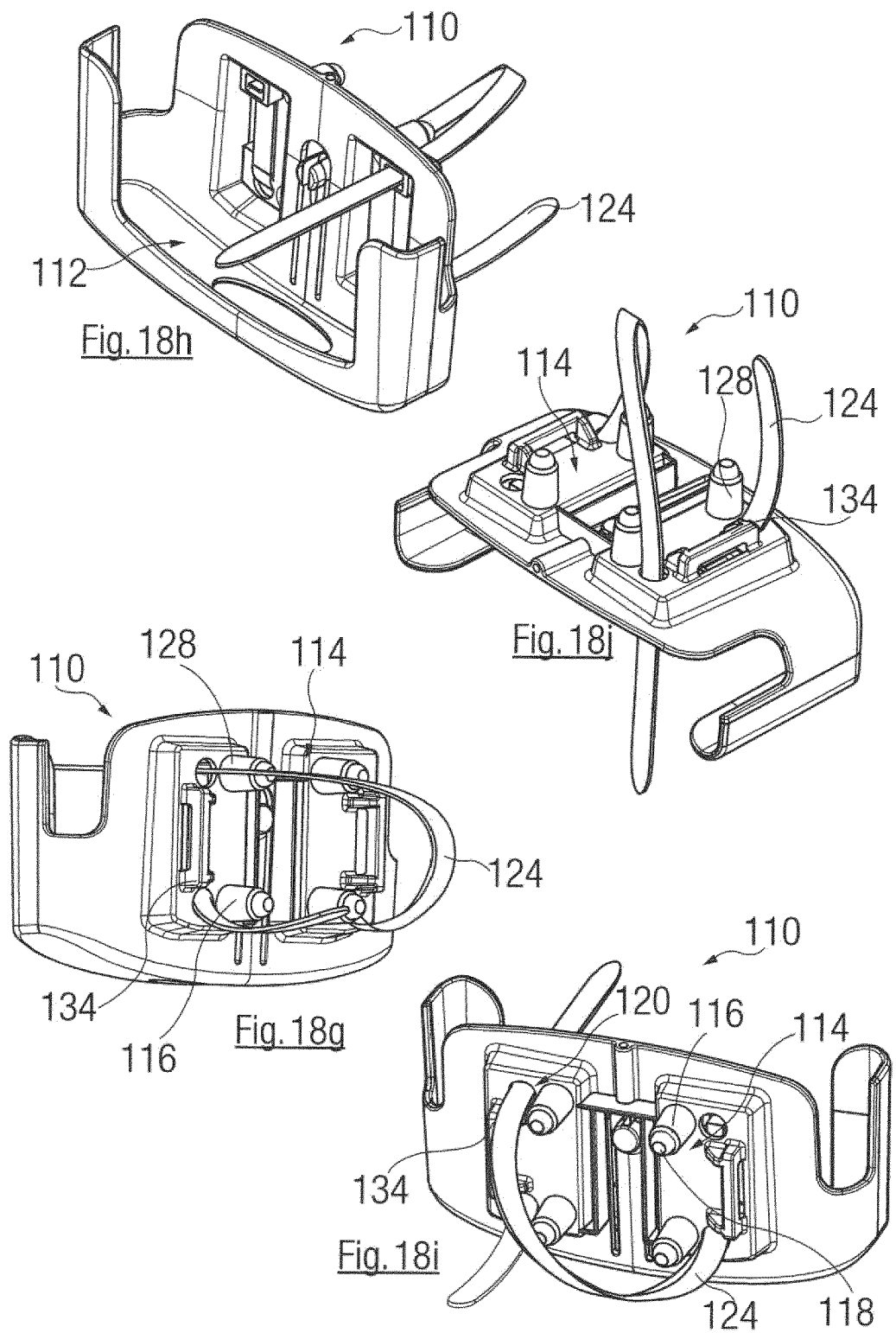

PIECE OF FITNESS EQUIPMENT

TECHNICAL FIELD

The present invention relates to a piece of fitness equipment. The piece of fitness equipment comprises at least one pressure chamber to which a fluid can be applied and which is suitable for fitting to a body part of a person, a pump that is connected with the pressure chamber and is suitable for applying a fluid to the pressure chamber, a controller for controlling the pump, and a wearable holder that serves for holding the pressure chamber to the body part.

The present invention further relates to a method for controlling a piece of fitness equipment, a piece of fitness equipment with a carrier for carrying a pump on a body part of a person, a piece of fitness equipment with a charger for charging a pump, and a piece of fitness equipment with an hanger as well as an arrangement of the piece of fitness equipment with the aforementioned devices.

BACKGROUND OF THE INVENTION

A related device is for example known from publication WO 2007/137313 A1.

A task of the present invention is to improve the device of the type described above. A further task of the present invention is to make the devices known from prior art more adaptable to the person's girth. A further task of the present invention is to establish a device that can be fit to different body parts.

SUMMARY OF THE INVENTION

The aforementioned tasks can be carried out by a piece of fitness equipment according to one or more versions of the invention.

In the following, the piece of fitness equipment will be referred to as an apparatus or a device.

According to an embodiment of the invention, it is intended that the pressure chamber is embodied tubularly, thus in form of a tube, which preferably embraces the body part. The embodiment according to the invention has an associated advantage that the pressure chamber can be fit to different body parts or body portions and to persons with different body measurements or girths.

The device according to the invention serves to intensify fat burning in a body part of a person by stimulating the blood circulation within this body part. Preferably, the person's pulse is within the fat burning zone. This can be achieved, for example, by the person performing endurance training on an appropriate training device when using the device according to the invention. The fluid is preferably a gas or a gas mixture, further preferably air.

In a preferred embodiment of the device, the device is fittable to a person. Preferably, the wearable holder comprises a layer. Further preferably, the layer is arrangeable between the pressure chamber and the body part. Alternatively, the pressure chamber can also be fittable to the body part in such a way that the pressure chamber directly fits to the body part. Preferably, the wearable holder is detachably connectable with the pressure chamber.

In a preferred embodiment, the pressure chamber substantially extends in a longitudinal direction and provides an approximately circular cross-section across the longitudinal direction. This embodiment has an associated advantage that the pressure chamber is more simply connectable with the wearable holder by inserting the pressure chamber into the wearable holder.

Preferably, the pressure chamber is made of silicone. This embodiment has an associated advantage that the pressure chamber is reversibly stretchable in the longitudinal direction so that the pressure chamber adapts to the body part and the carrying comfort of the apparatus is improved.

Preferably, the pressure chamber provides a fitting that is detachably connectable with the pump. This embodiment allows that one and the same pump is usable with different pressure chambers that have, for example, different lengths or different diameters. By this embodiment, the apparatus is more versatilely applicable.

The fitting preferably comprises a reducer that is further preferably made of silicone. The reducer preferably comprises a connecting portion and a junction portion. Preferably, the connecting portion is connected, preferably materially bonded, with the pressure chamber.

Further preferably, the pressure chamber provides a closure that closes the pressure chamber at the opposite end of the junction section. This embodiment has an associated advantage that the pressure chamber can be manufactured in the desired length in a simple way by a tube forming the pressure chamber being cut to the desired length and being closed by the closure. Preferably, the closure can be formed by a knot being inserted into the pressure chamber.

Preferably, the pressure chamber comprises at least one splitter that is arranged between a base section and at least two branch sections with the branch sections and the base section being connected by the splitter. This embodiment has an associated advantage that the pressure chamber can run along various body parts by its branch sections. This is, for example, advantageous when the apparatus is worn on the buttocks or the thigh part of the person, wherein the base section runs above the groin and the at least two branch sections each run along a thigh.

In a preferred embodiment, the splitter is directly connected with the fitting. Further preferably, the splitter is formed integrally (as one part) with the fitting. According to this embodiment, no base section is arranged between the fitting and the splitter. This embodiment has an associated advantage that a separate part forming the splitter can be dispensed with so that the carrying comfort is improved for the user.

Preferably, the pressure chamber has a cross-section running across the longitudinal direction that is between 10 mm and 40 mm, preferably between 20 mm and 30 mm. Preferably, the base section and/or the branch section provides a diameter from 10 mm to 40 mm, preferably 20 mm to 30 mm.

Preferably, the connecting portion has a cross-section running across the longitudinal direction that is between 10 mm and 40 mm, preferably between 20 mm and 30 mm. Preferably, the junction portion provides a cross-section running across the longitudinal direction between 10 mm and 2 mm, further preferably between 3 mm and 6 mm.

Preferably, the pressure chamber and/or the base section and/or the branch section have a wall thickness between 0.1 mm and 2 mm, preferably between 0.2 mm and 1 mm, further preferably approximately 0.5 mm.

In a preferred embodiment, the apparatus according to the invention is characterized by two pressure chambers with the pump being suitable for alternatingly applying the fluid to the two pressure chambers. This embodiment improves the result that is achievable by the device according to the invention. Two of the pressure chambers can be designated as a first pressure chamber and a second pressure chamber.

Preferably, a carrier is assigned to the pump. The carrier serves for attaching the pump to the body of the person. Preferably, the pump includes a notifier or other indicator that serves for indicating the state of charge of a rechargeable battery of the pump to the user. The notifier can comprise a display and/or a sound speaker.

Preferably, the wearable holder is made of an elastic material. This embodiment ensures that the wearable holder adapts to the body part of the person.

Preferably, the wearable holder is made of a textile material. Further preferably, the wearable holder is made of a breathable material. This embodiment substantially contributes to the carrying comfort of the device.

In a preferred embodiment, the wearable holder provides at least one channel, into which the pressure chamber and/or the base section and/or the branch section is insertable.

Preferably, the wearable holder includes at least one first layer and at least one second layer. Preferably, the channel runs between the first layer and the second layer. Further preferably, the first layer and the second layer are connected by at least one seam. Further preferably, the first layer, the second layer, and the at least one seam define the channel. Preferably, the wearable holder is formed in the shape of a garment. This embodiment facilitates the fitting of the apparatus to the body part. Preferably, the garment is formed as trousers.

Preferably, the second layer forms the coating. Preferably, the first layer is formed thicker than the second layer. Further preferably, the first layer is formed thicker than the second layer by at least factor 2. Preferably, the second layer is stretchable. Further preferably, the second layer is more stretchable than the first layer. This embodiment allows that the built up pressure that is applied to the body part by the pressure chamber is confined by the first layer, but the second layer flexes in response to the pressure with the effect of the device thus being improved. As the chamber tends to lift from the body part due to the pressure building up inside the pressure chamber, an extension of the perimeter of the pressure chamber by some percentage points results. The elasticity of the pressure chamber allows this extension, but it works against it, whereby a support of the direct air pressure effect arises.

It is preferred that the pump includes a sensor that measures the pressure of the fluid inside a first tube and/or inside a second tube.

The sensor preferably comprises a pressure sensor that measures the pressure of the fluid inside the first tube and/or inside the second tube. The result of the measuring is preferably transmitted to the controller that controls the operation of the pump based on the pressure measurement of the sensor. Particularly, if the pressure measured by the sensor is above a pressure limit, the operation of the pump is stopped. The pressure limit preferably is equivalent to the working pressure or it is 5%, 10% or 20% higher than the pressure limit.

Particularly, if the pressure inside the first tube and or inside the second tube is higher than a prescribed working pressure, this indicates an obstruction, a folding or other blockage of the first and/or second tube. In such a case, the operation of the pump is then terminated. The sensor can thus be used to indicate the accurate connection and the proper arrangement of the pressure belt, the pump, and the tubes.

It is preferred that the pump includes a rechargeable battery and a detector for detecting the state of charge of the rechargeable battery, and preferably includes a notifier for issuing a message, particularly a noise.

Preferably, the pump and the controller and/or the sensor are operated by the battery. A rechargeable or a non-rechargeable battery can be used. The detector for detecting the state of charge detects the state of charge of the rechargeable battery, for example, by measuring voltage and current. If it is determined that the state of charge of the battery is below a lower limit value, the notifier is activated for issuing a message to the user. The message can be produced by an indicator, such as a light. Advantageously, it is useful to provide the message by a noise that is, for example, made by a speaker. This has an associated advantage that the message stating that the state of charge is below a certain level can also be noticed by the user while the pump is attached inside the carrier.

According to another aspect of the invention, a piece of fitness equipment comprises a carrier for carrying a pump on a body part of a person. The carrier comprises a main body that has a first end and a second end, a fastener suitable for connecting the first end and the second end with each other, and a holder for detachably attaching the pump to the main body.

The body part, to which the carrier is intended to be attached, can preferably be the torso, particularly the belly area of the person. The main body is, for example, formed as an elongated tape. By connecting the first end with the second end, the carrier can be attached to the body part of the person by enclosing the body part so that the person can carry the pump. The pump can be attached to the main body using the holder, so that preferably the pump is held by the carrier. The holder can be attached to the main body detachably or fixedly.

It is preferred that the main body includes an inner side facing toward the body part and an outer side facing away from the body part with the holder being arranged on the inner side and preferably formed as a closable pocket.

By the arrangement of the holder on the inner side, the pump can be carried by the person using the carrier in such a way that the pump is hidden from view. Furthermore, tubes, which lead away from the pump and are for example connected to a pressure chamber, as is described before, do not have to be directed around the belt. By the preferred forming of the holder as a closable pocket, the pump can be quickly and easily fixed to the carrier.

It is preferred that the holder includes a first opening and a second opening with the second opening preferably being arranged opposite of the first opening.

Preferably, either of the openings is intended for establishing access to the pump. For example, a controller, such as a switch, can be operated at the pump through the first opening. Moreover, tubes leading away from the pump can be directed out of the holder through the second opening so that the holder can be closed, which itself enables the pump to be secured within the holder.

It is preferred that the main body includes at least one strap at the inner side.

Preferably, the strap serves for holding, and thus also for directing, the tubes of the pump. Furthermore, a shifting of the tubes can be avoided, which on the one hand can be found disturbing by the person and on the other hand can lead to a loosening of the tubes from the pump or from the pressure belt.

It is preferred that the main body and/or the holder and/or the flap are made of a textile, particularly breathable material that is preferably elastic and further preferably comprises neoprene.

The main body, the holder and the flap can be made of the same material or of different materials. If an elastic material is used, this preferably improves the mobility of the person that carries the carrier. Particularly, if the holder is made of an elastic material, the pump is securely fixable due to the elasticity of the holder, as the elastic material's tension can induce a greater holding force for holding the pump. The material neoprene is preferred.

It is preferred that the fastener comprises a hook tape, which is arranged on the inner side over an area of the first end, and a loop tape, which is arranged on the outer side over an area of the second end, with the hook tape being engageable with the loop tape for connecting the first end with the second end.

The hook tape preferably provides a plurality of hooks, especially barbed hooks or mushroom heads, which interlock with the loop tape, which preferably provides a plurality of curled strings. A hook and loop fastener is an example of such a fastener. Preferably, the loop tape extends along a prolonged area so that the carrier can be adapted to body parts of most different sizes.

It is preferred that the main body of the carrier is provided with a further loop tape on at least a portion of the outer side of the main body.

Preferably, the further loop tape extends over a major part of the outer side of the main body and more preferably the loop tape of the fastener is continuously formed as a part of the loop tape at the second end of the main body.

It is preferred that the piece of fitness equipment further includes an object holder for attaching an object, particularly a media playback device, to the main body of the carrier, with the object holder being preferably made of a textile, particularly elastic, material, which preferably comprises neoprene.

The object can be, for example, an MP3 player or a cellular phone. If the object holder is made of elastic material, the object can be securely fixed to the object holder by the tension produced during the object's insertion.

It is preferred that the object holder is detachably attached to the main body with the object holder having a second hook tape for the detachable attachment to the loop tape of the carrier.

If the further loop tape of the main body of the carrier extends along a large area of the carrier, the object holder can be attached at various locations along the carrier. Also in this case, the detachable attachment can be a hook and loop fastener between the main body and the object holder.

A method according to the invention serves for controlling the apparatus according to the invention with the pump including a first valve that is connected with the first pressure chamber, a second valve that is connected with the second pressure chamber, and a compressor that is connected with the first valve and the second valve.

The method comprises the following method steps:
a) opening the first valve;
b) operating the compressor with the first valve being opened;
c) stopping the compressor as soon as the pressure of the fluid inside the first pressure chamber reaches a prescribed pressure;
d) opening the second valve;
e) closing the first valve;
f) operating the compressor with the second valve being opened;
g) stopping the compressor as soon as the pressure of the fluid inside the second pressure chamber reaches a prescribed pressure;
h) opening the first valve and closing the second valve.

Preferably, step e) is performed after step d) in order to achieve pressure compensation between the first chamber and the second chamber.

Alternatively, step d) is performed after step e), and/or step d) and step e) are performed at the same time. Preferably, the pressure compensation between the first chamber and the second chamber is achieved by establishing a connection between the first chamber and the second chamber.

Preferably, the opening of the first valve during step h) is performed before the closing of the second valve.

Alternatively, the opening of the first valve during step h) is performed after the closing of the second valve and or at the same time as closing the second valve.

Preferably, a connection between the second chamber and an environment surrounding the device is established during performance of steps b) and/or c) and/or after performance of steps b) and/or c).

Preferably, a connection between the first chamber and an environment surrounding the device is established during performance of steps f) and or g) and/or after performance of steps f) and/or g).

In a preferred embodiment, the compressor is operated between 2 and 10 seconds, preferably approx. 5 seconds, within method steps b) and f).

Preferably, the pressure to be reached by the fluid in the first pressure chamber and/or the second pressure chamber is between 0.3 bar and 0.8 bar, preferably 0.6 bar.

Preferably, between steps c) and d) the pressure inside the first pressure chamber as well as between steps g) and h) the pressure inside the second pressure chamber is maintained for 6 to 30 seconds, preferably for approximately 15 seconds.

In a preferred embodiment, the first valve and the second valve remain open at the same time for 1 to 5 seconds, preferably for about 3 seconds, between method steps d) and e). In a preferred embodiment, the first valve and the second valve remain open at the same time for 1 to 5 seconds, preferably for about 3 seconds, between method steps h) and a). This embodiment offers the advantage that pressure compensation occurs between the pressure chambers and thus the amount of the fluid to be applied is reduced, whereby a lower pumping performance of the compressor is needed.

Preferably, a function test of the pump is performed in the method. Preferably, the function test is performed before operation of the compressor.

Preferably, the function test comprises a verification of the condition of the pressure chamber, respectively the hoses and/or the reducer. Preferably, the condition can be free, occluded or bent. Preferably, it can be determined by the function test, if the pressure chamber, respectively the hoses and/or the reducer is free, occluded or bent. Preferably, a loss of pressure inside the pressure chamber and or a leaking spot of the pressure chamber can be determined by the function test.

The invention further provides a piece of fitness equipment that comprises a charger for charging a pump that comprises a rechargeable battery and a contact portion, which is electrically connected with the battery. The charger comprises at least one port, in which the pump can be inserted, and a power source, wherein the port comprises a counter-contact portion that touches the contact portion and is connected with the power source, if the pump is inserted into the port for charging the battery.

The power source is, in particular, a connection to an external power network and can provide a transformer for transforming the voltage of the external power network into the voltage of the rechargeable battery.

The contact portion of the pump can be an externally accessible socket. If the pump is inserted into the port, the contact portion abuts against the countercontact portion and connects the battery with the power source. The counter-contact portion can be a peg or a pin.

It is preferred that the charger comprises a plurality of ports which are preferably arranged one above the other. It is further preferred that the counter-contact portions of the ports are each connected with a single power source.

Thus, in particular, a plurality of s ports can be charged by a charger, for which preferably only a connection to an external power network is mandatory. It is also preferred that the ports are stackable one above the other so that they firmly stand on top of each other and are electrically connected with each other at the same time.

Further, the operation of the charger is particularly simple, as the pump only has to be inserted into the charger, particularly into the port. In particular, it is not necessary to connect the pump with the charger in a separate step.

It is preferred that the piece of fitness equipment further comprises a detector that is capable of detecting an ID, particularly a membership card or a bank card, wherein preferably the detector includes a retainer that secures the pump against removal, if the ID was not detected.

The ID can be a bankcard, a membership card or the like and can be provided for every port. If the identification means is card-shaped, the detection device can be a card reader, which is particularly assigned to each port. If the D is detected by the detector, the retainer can release the pump in the port so that the user can remove the pump. The retainer is preferably assigned to each port so that the removal of single s pump can be controlled individually. The retainer can be, for example, a lock.

By help from the detector and the retainer, it is possible to automatically control the release of s the pump using the charger. The ID can then serve for purposes of detection or as deposit.

It is preferred that the charger, particularly at least one port, provides a mounting for an attachment to a wall.

The mounting can be for example an eye or a recess in the port, by which the charger can be attached to a wall. The mounting is particularly accessible through the port, so that for example a screw can be screwed through the mounting. The mounting can be provided at each port or at only one port of the charger. By means of the mounting, the charger can be directly attached to a wall or, if the charger is parked, can be secured against falling over.

It is preferred that the hanger further provides a rack for attaching the carrier and/or the pressure belt.

The rack can for example be formed as a shelf or as protrusions, such as in the type of a wardrobe, for hanging up the pressure belt and/or the carrier. The rack can further comprise horizontal rods, onto which the pressure belt and/or the carrier can be hung up.

The invention further relates to a piece of fitness equipment that comprises a hanger. The hanger has a holding portion for attaching a pump and an attachment portion for attaching the hanger to an object with the attachment portion comprising an abutting section and a fastening section.

The anger particularly serves for attaching the pump to an apparatus for physical exercise, such as a treadmill, an indoor cycle, or a stepper. If the pressure belt, as described above, is used at the same time, the pump can be attached to the apparatus with the carrier being unnecessary in this case. The holding portion particularly serves for fixing the pump, and the attachment portion is attached to the apparatus, particularly to a rod of the apparatus. Therefore, the device or the rod can abut on the abutting section and be fixed by the fastening section. The hanger can be attached to a vertical or horizontal rod.

It is preferred that the holding portion comprises an upper half side with the upper half side being open for inserting the pump.

This means that the holding portion can be formed as a bowl that particularly has similar inner dimensions like the outer dimensions of the pump, so that the pump can indeed be easily inserted but is fixed against vibrations.

It is preferred that the abutting section comprises a base section and a contact section with the base section having at least two openings, into which the contact section is pluggable. It is further preferred that the contact section is formed as an abutting surface or at least as two abutting protrusions.

The base section particularly serves for attaching different contact sections to the hanger. As the apparatus and particularly the rod can have most different dimensions, it is purposive to adapt the attachment portion to the apparatus. Different contact sections are helpful for this. An easy exchange of the contact section is possible, as the contact section can be screwed or plugged, particularly latched, into openings of the base section. The base section preferably has four openings. Latching devices can be provided at the base section or the contact section for interconnection.

It is preferred that the contact section is formed as an abutting surface or as at least two abutting protrusions.

The abutting surface can be planar or can be provided with a round or an angular protuberance. The abutting protrusions can be rubber bungs that have an especially high friction coefficient so that a high friction results between the device and the contact section.

It is preferred that the fastening section is a bendable tape, particularly a cable tie.

A cable tie represents a particular simple and quick attachment to the apparatus. However, any other tape that can be closed at its free ends for example by a buckle or a latching device is possible.

BRIEF DESCRIPTION OF THE DRAWING FIGURES

Figure 2:
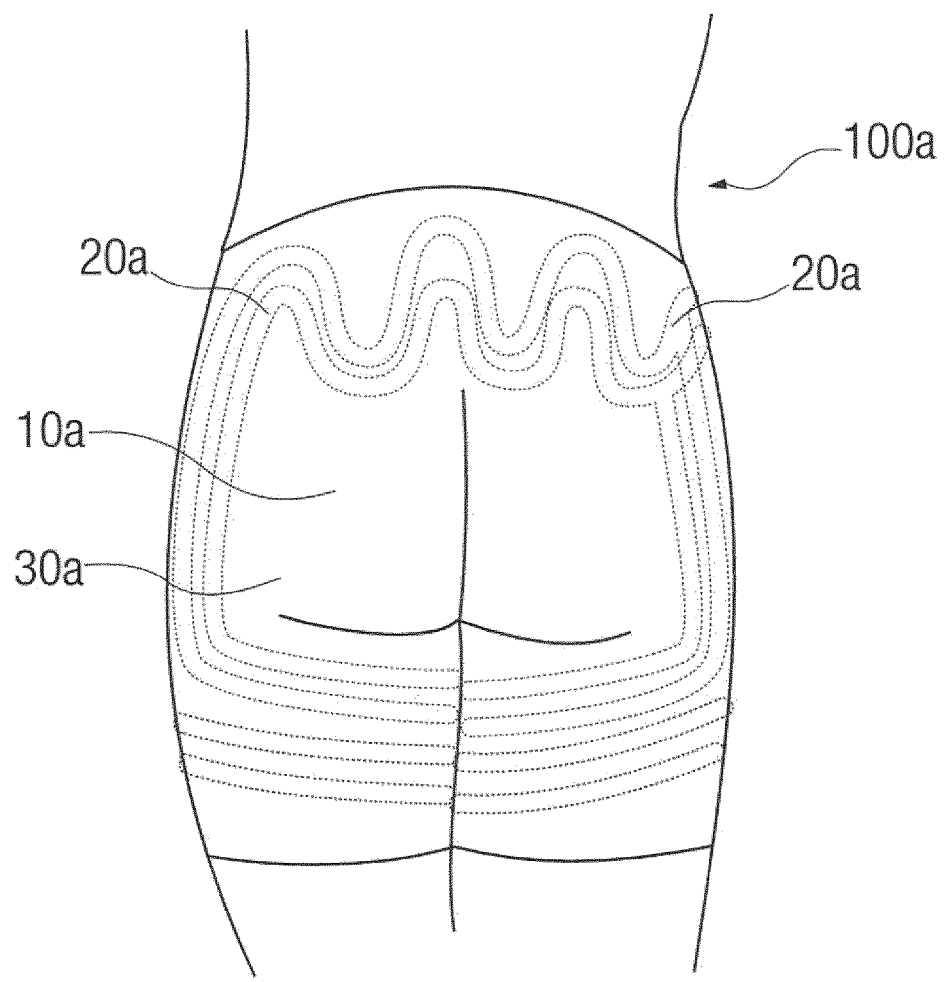
Figure 3:
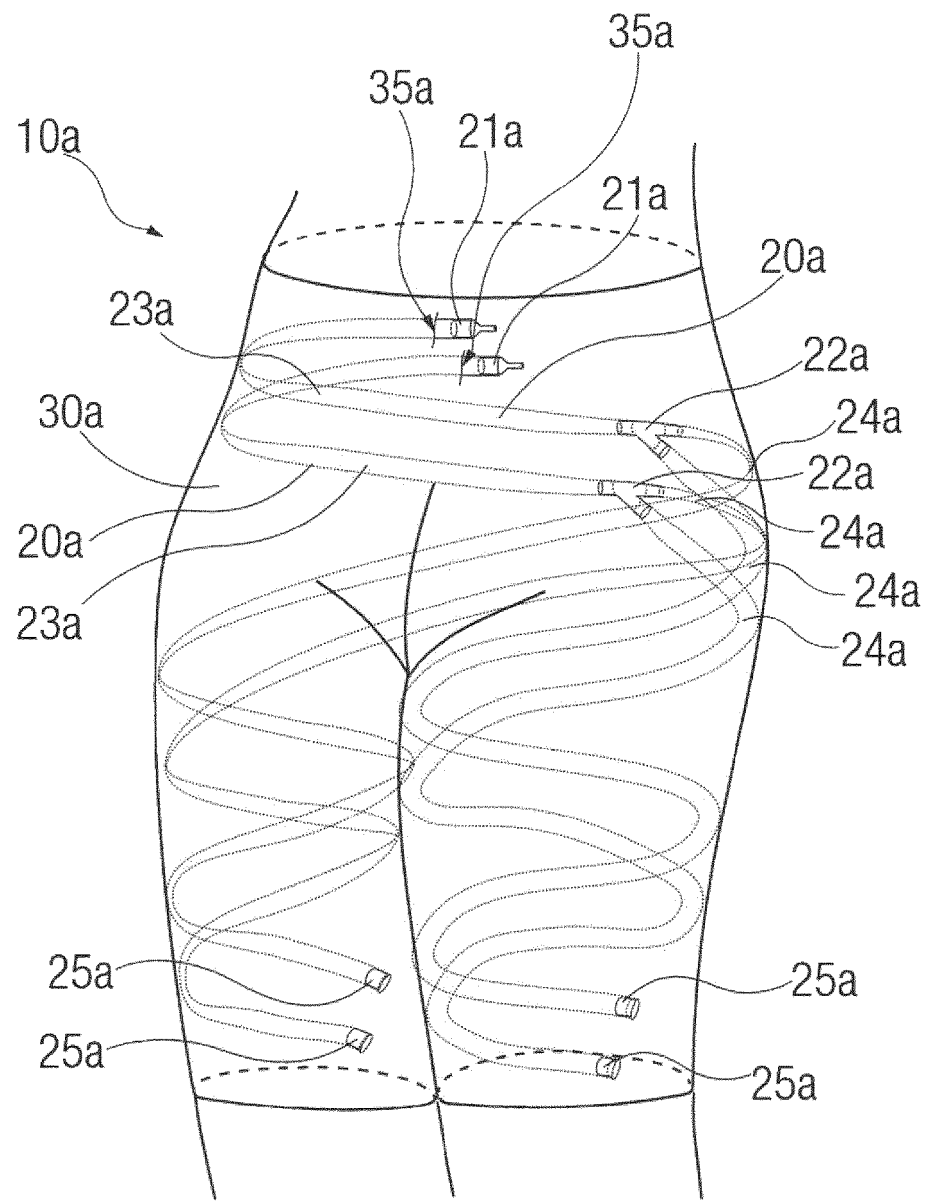
Figure 4:
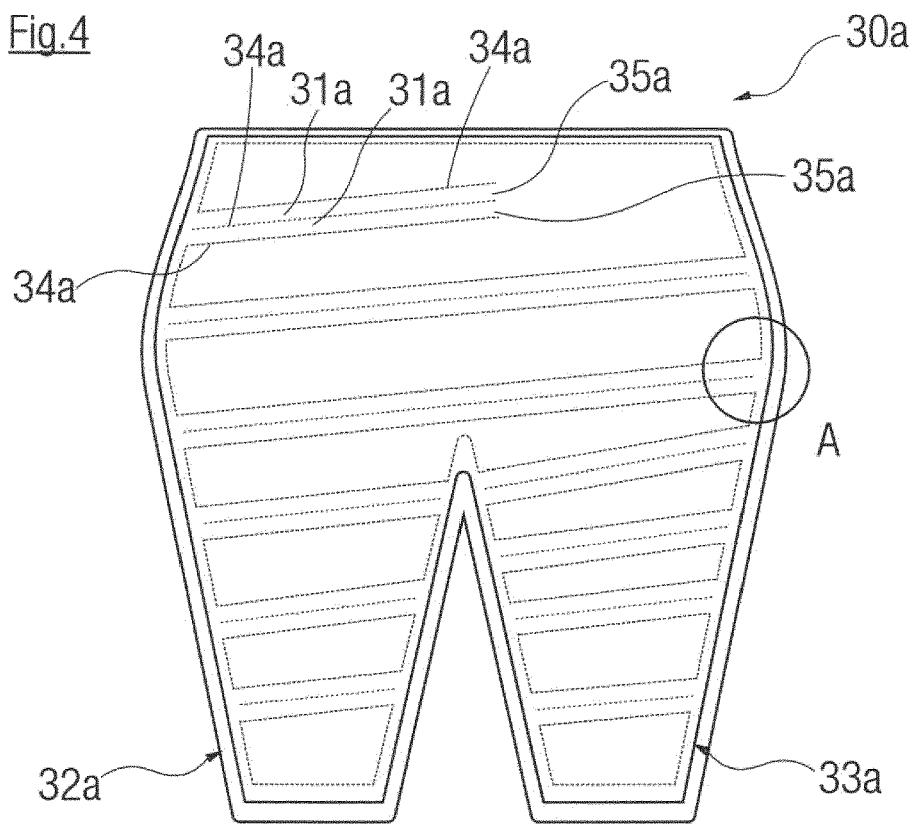
Figure 4A:
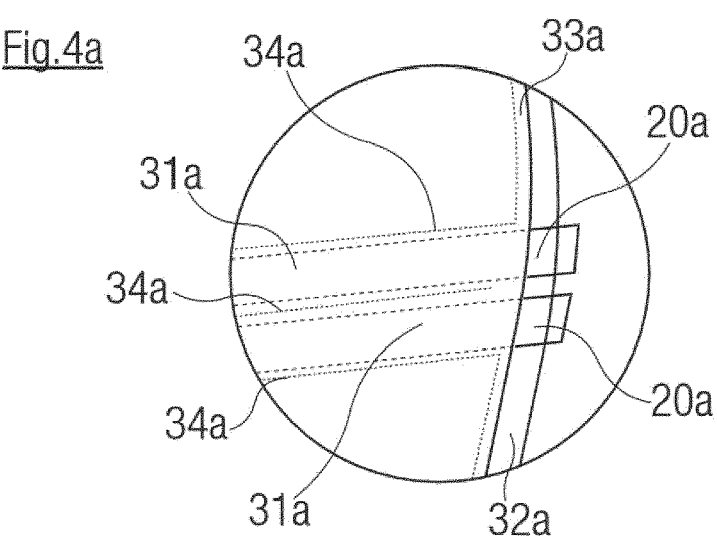
Figure 5:
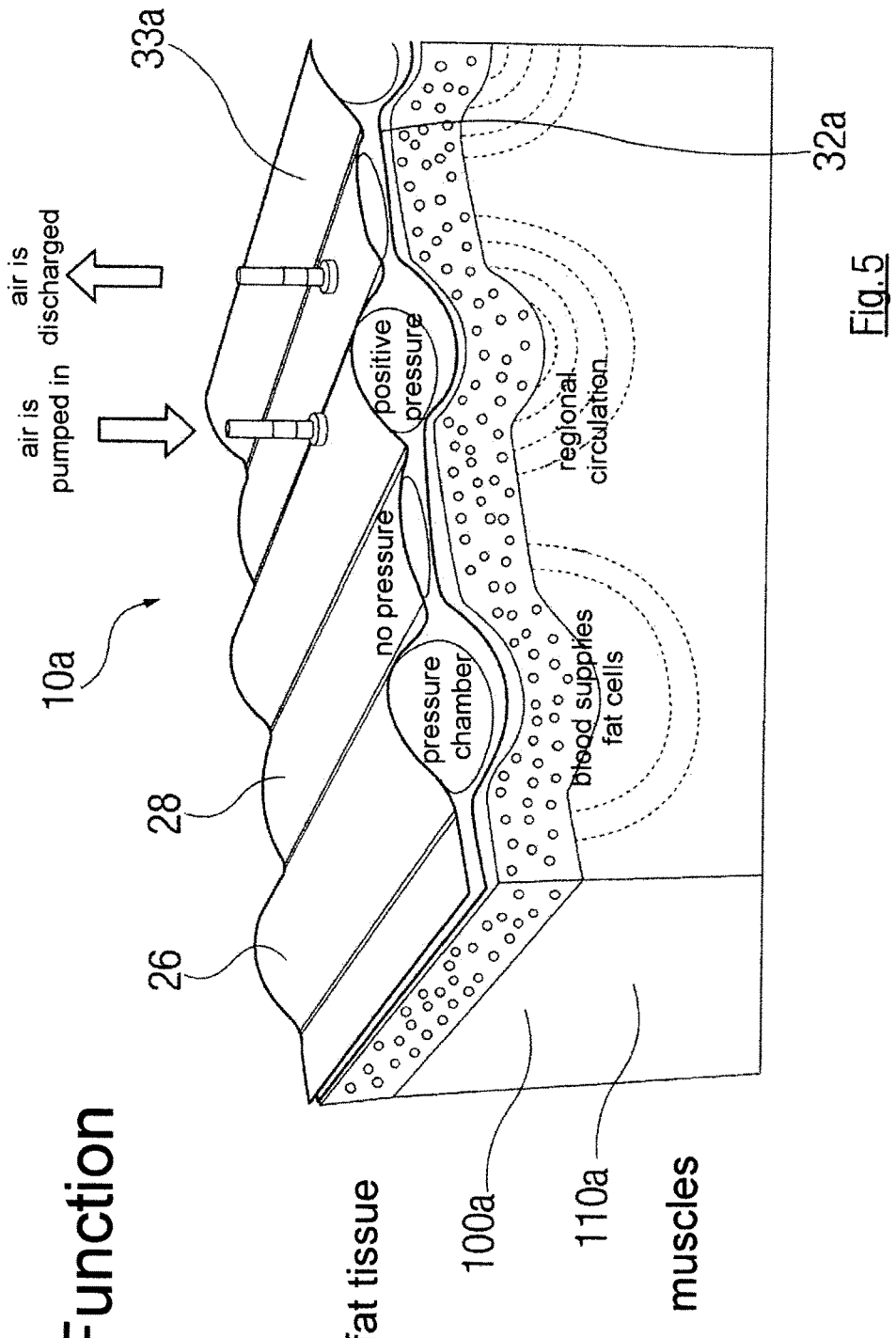
Figure 6:
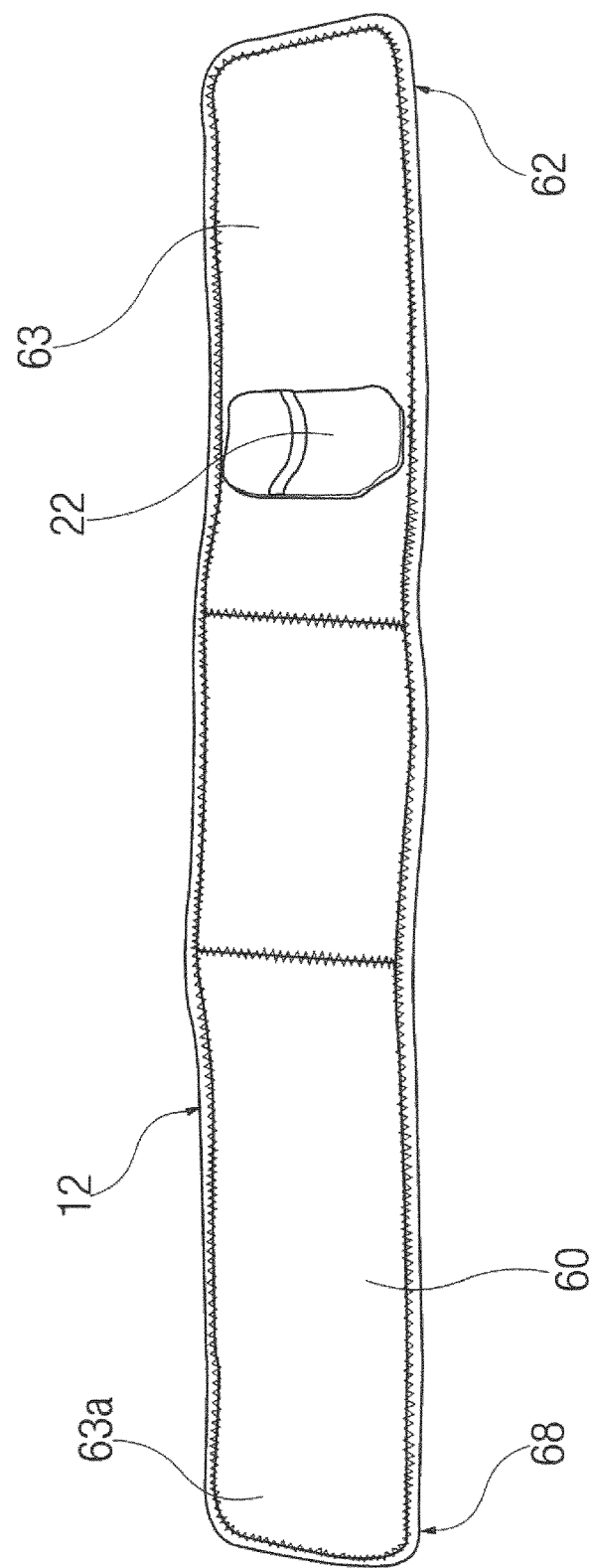
Figure 7:
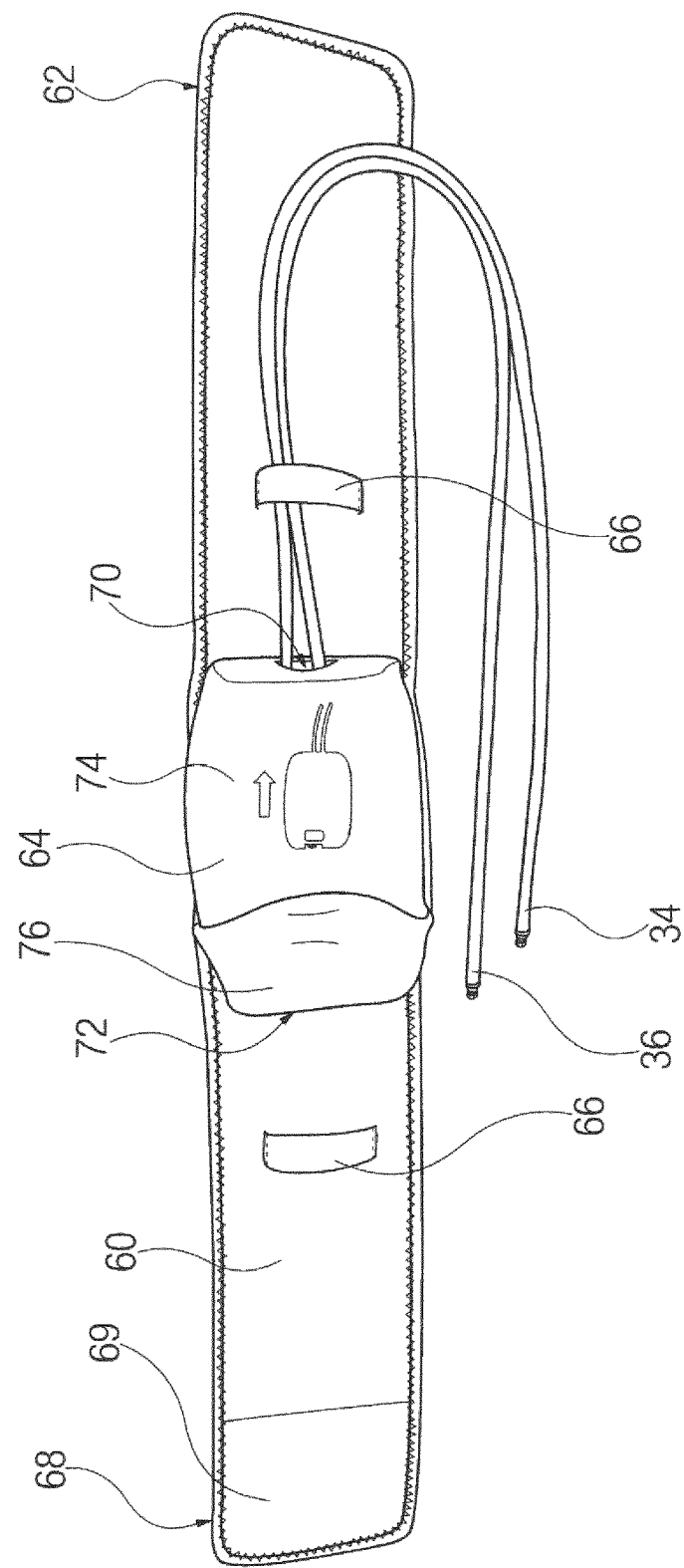
Figure 13:
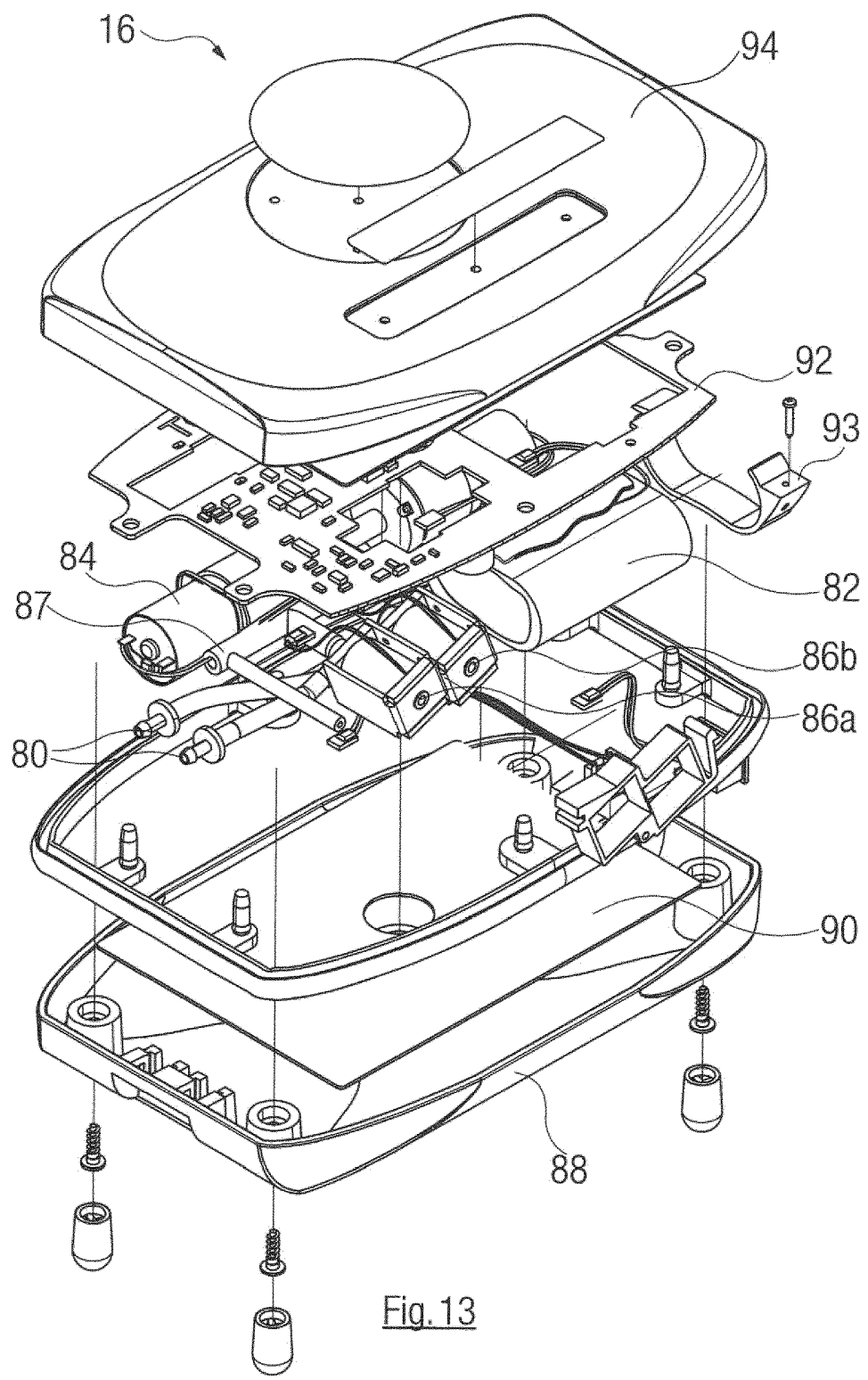
Figure 18E:
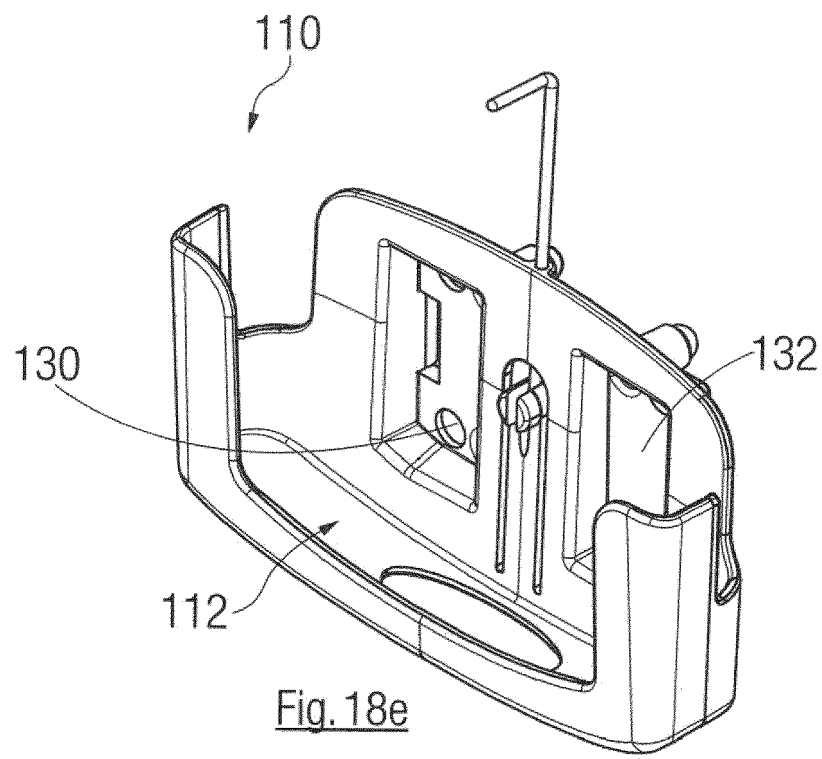
Figure 18F:
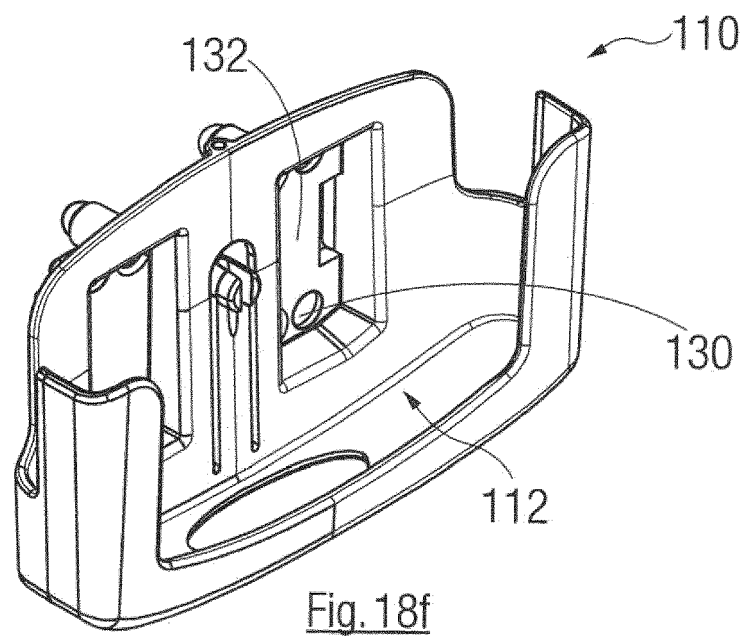
Figures 18K, 18L:
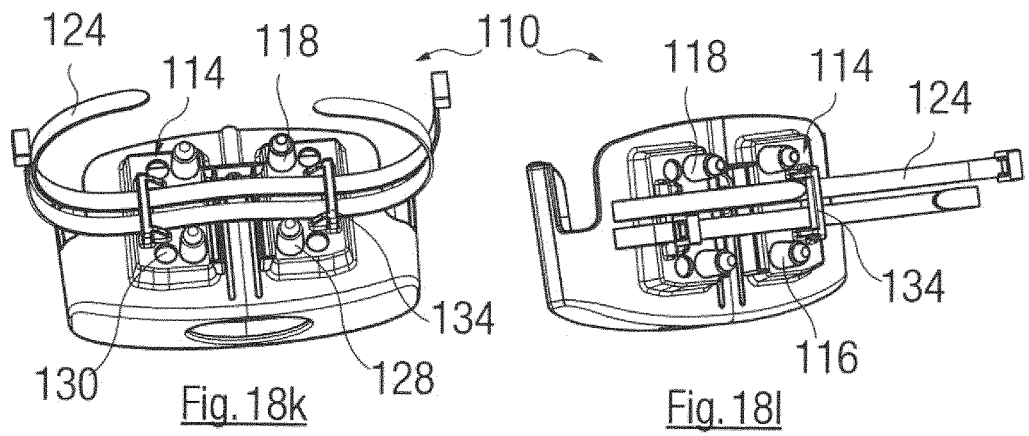
Figures 18M, 18N:
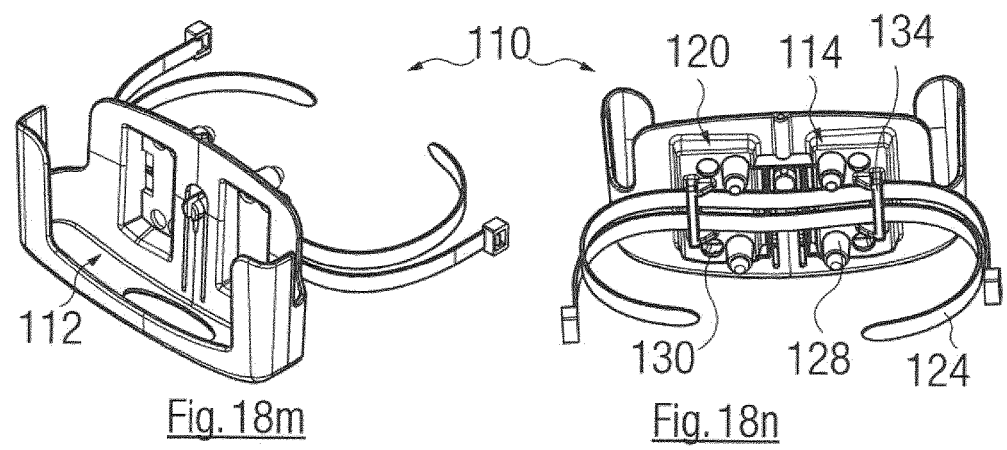
Figures 18O, 18P:
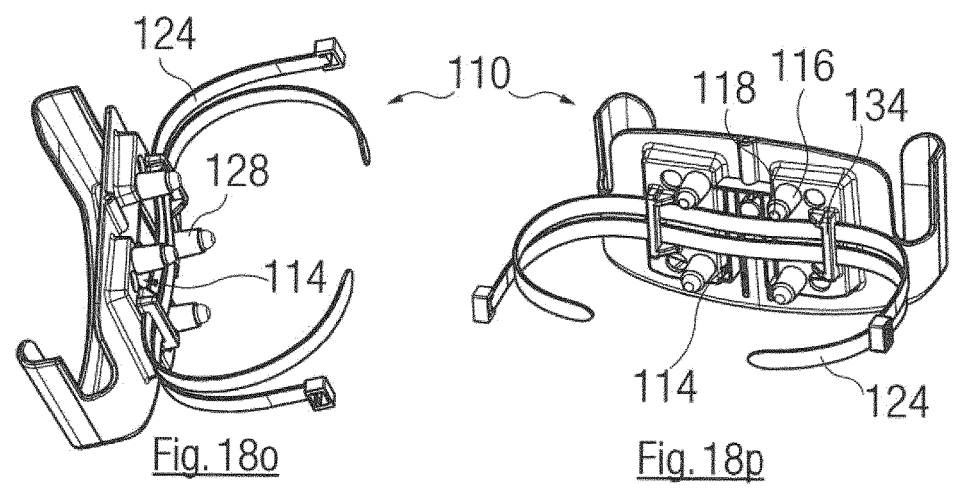
Figure 19A:
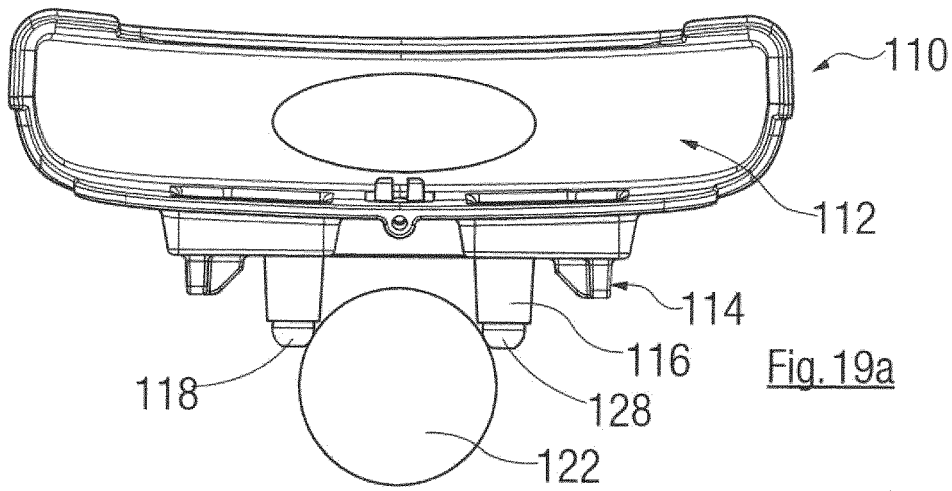
Figure 19B:
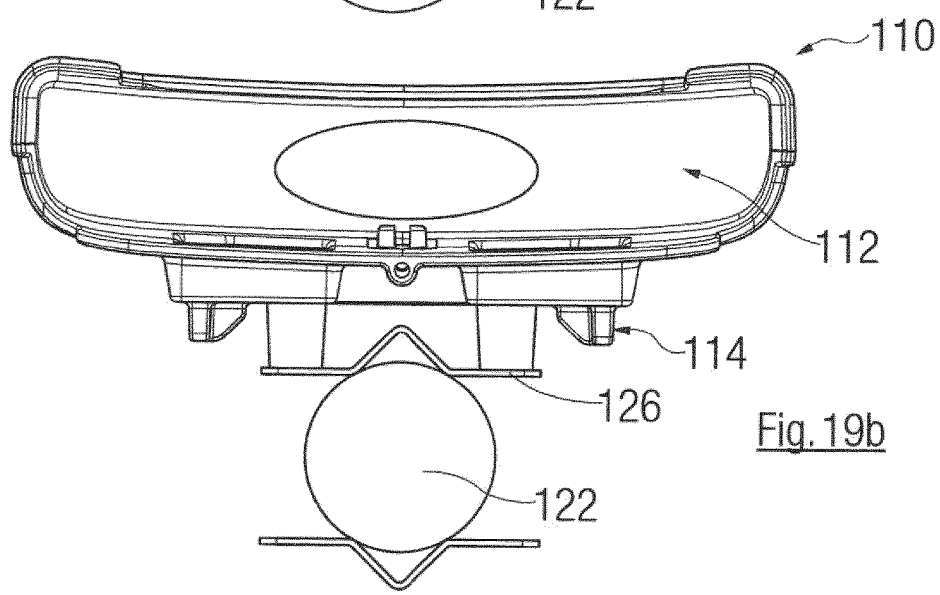
Figure 19C:
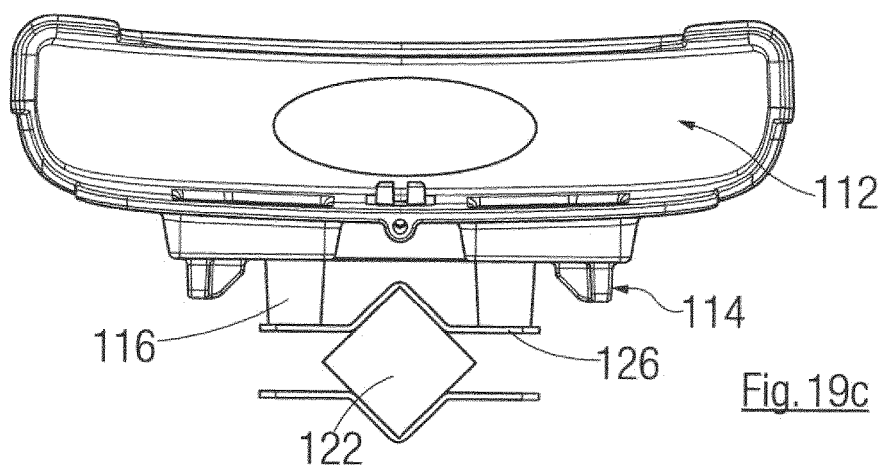
Figure 20A:
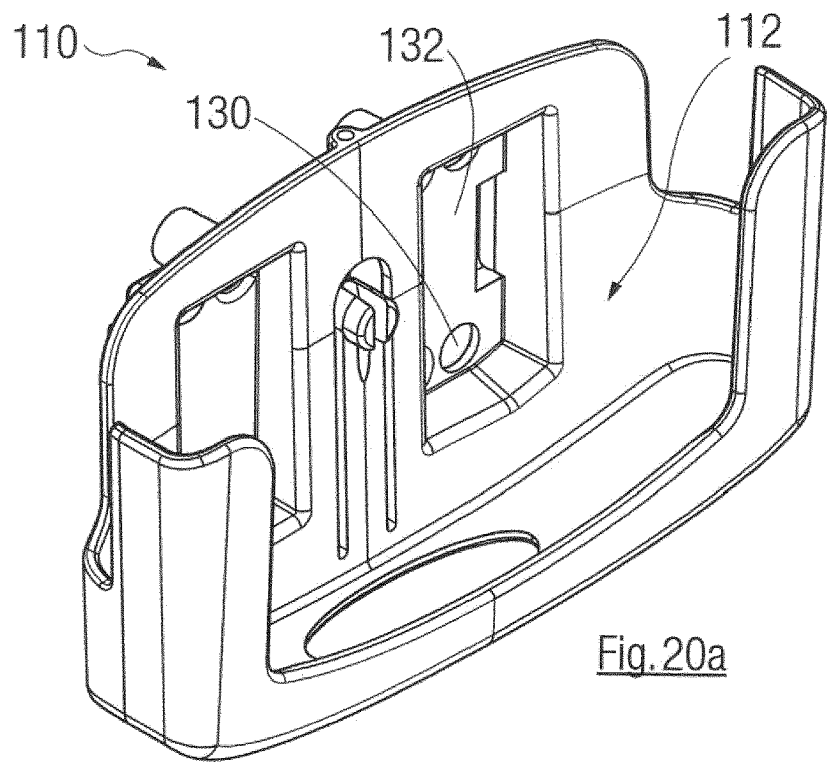
Figure 20B:
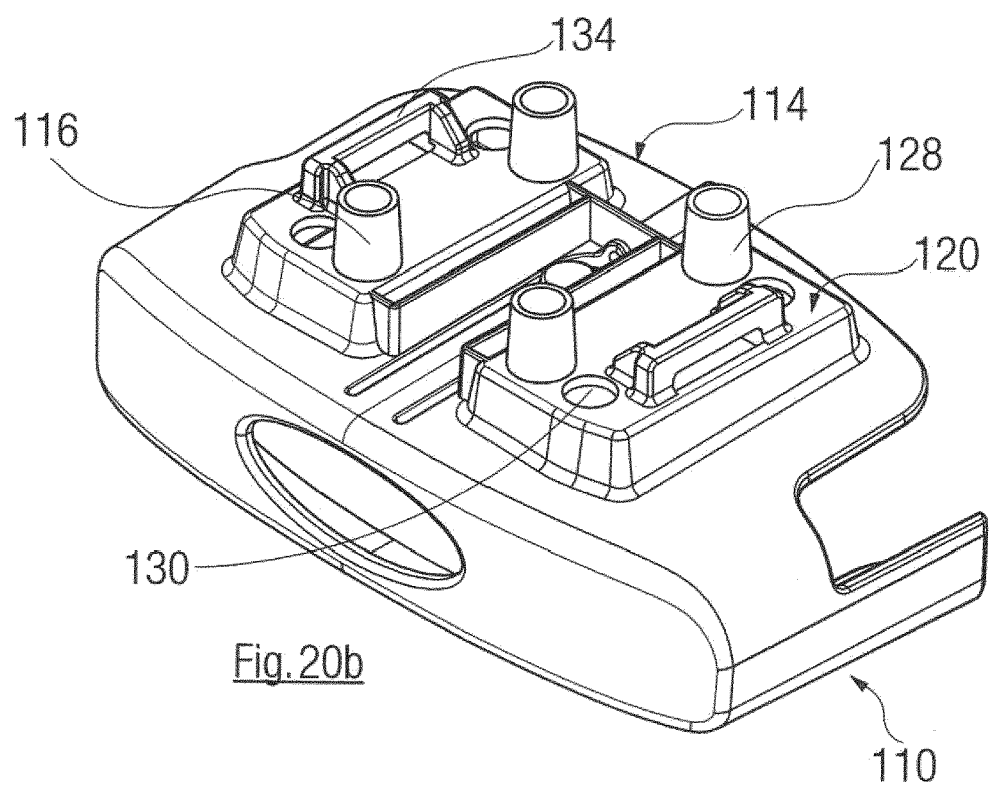
Figure 21:
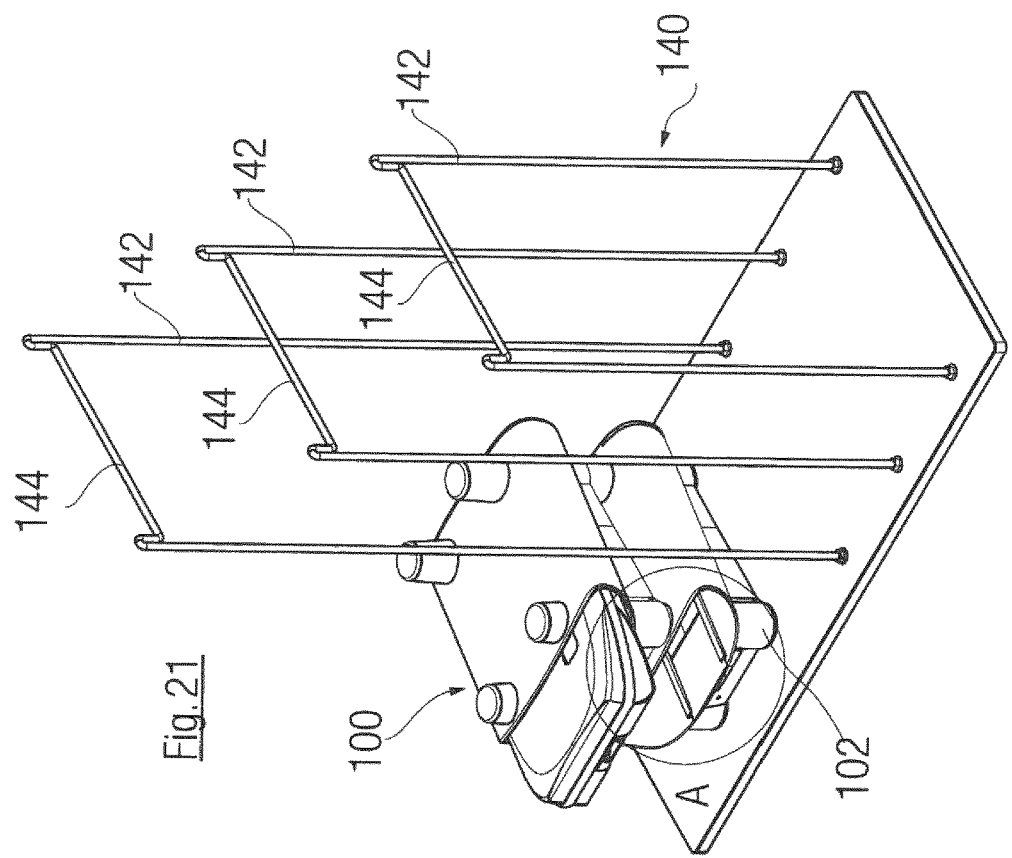

Further features and advantages of the apparatus according to the invention (piece of fitness equipment) result from the two exemplary embodiments described in the following. In the drawings representing the exemplary embodiments only schematically, it is in detail illustrated:

FIG. 1 the inventive apparatus according to one exemplary embodiment in a front view;

FIG. 2 the inventive apparatus according to one exemplary embodiment in a rear view;

FIG. 3 a perspective view of the inventive apparatus according to a second exemplary embodiment FIG. 4 a schematic representation of the wearable holder of the second exemplary embodiment;

FIG. 4a a part view of section A of the wearable holder represented in FIG. 4; and FIG. 5 a schematic representation of the principle of effect of the piece of fitness equipment according to the invention;

FIG. 6 an outer side of the carrier;

FIG. 7 an inner side of the carrier with a pump;

FIG. 8 a tube;

FIG. 9 a front side of the object holder;

FIG. 10 a back side of the object holder;

FIG. 11 a perspective view of the pump with two tubes;

FIG. 12*a*-12*g* different views of the pump;

FIG. 13 an exploded view of the pump;

FIG. 14 an inner part of the pump;

FIGS. 15*a* to 15*c* different views of a charger;

FIGS. 16*a* to 16*b* sections through the charger as indicated in FIG. 15*a*;

FIG. 17 an enlarged illustration of a contact surface and a contact peg;

FIGS. 18*a* to 18*p* different perspective views of a hanger;

FIGS. 19*a* to 19*c* top view of the hanger;

FIGS. 20*a* to 20*b* further perspective views of the hanger;

FIG. 21 a charger with a rack and

Figure 22:
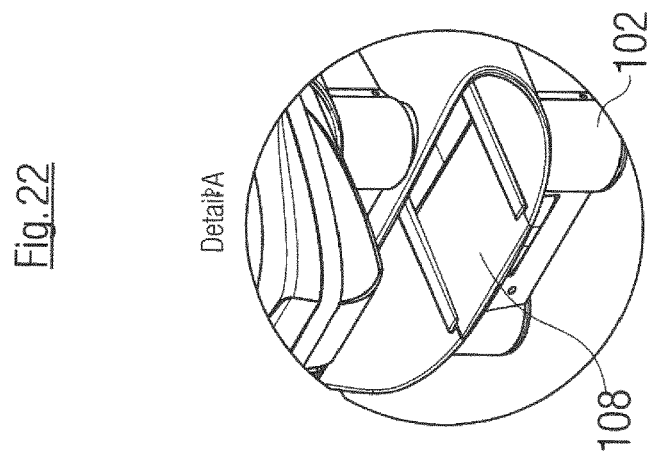

FIG. 22 an enlarged part from FIG. 21 showing a detector.

DETAILED DESCRIPTION OF THE INVENTION

The device 10*a* according to the invention serves for intensification of fat burning in a body part 110*a* of a person 100*a*. The body part 110*a* comprises the buttocks and the thighs in the present case. Preferably, the person 100*a* maintains a pulse that is within the fat burning zone. The fat burning pulse is usually 60% to 70% of the maximum heart rate of the exercising person 100*a*. Within this zone, the body obtains its energy particularly from the intramuscular fat and from the free blood fat. The fat burning pulse particularly depends on the sex and on the age of the exercising person 100*a*. Thus, a female person at the age of 25 years usually has a fat burning pulse between 121 and 141 heart beats per minute.

The device 10*a* according to the first exemplary embodiment has two pressure chambers 20*a*, which are also referred to as first pressure chamber 26 and second pressure chamber 28 to which a fluid can be applied. The fluid is introduced into the pressure chamber 20*a* by a pump 16. The device according to the first exemplary embodiment further comprises a controller 99 for controlling the pump 16. A wearable holder 30*a* serves for holding the pressure chambers 20*a* against the body part 110*a*. The pressure chambers 20*a* are detachably connectable with the wearable holder 30*a*. The pressure chambers 20*a* are formed in the shape of a hose. The device can comprise a carrier which is not shown, that serves to fit the pump 16 to the body of the person 100*a*.

As FIGS. 1 and 2 show, the device 10*a* according to the first exemplary embodiment includes two pressure chambers 20*a* running parallel and extending in a longitudinal direction. Thereby, both pressure chambers 20*a* run along the body part 110*a*. The pressure chambers 20*a* according to the first exemplary embodiment thereby run linearly without branch. The pressure chambers 20*a* provide a fitting 21*a* at one of their ends and a closure 25*a* at their other end, as is shown in FIG. 3.

The device 10*a* according to the second exemplary embodiment is shown in FIG. 3. The device 10*a* includes two pressure chambers 20*a* that are each separated into a base section 23*a* and two branch sections 24*a*. A splitter 22*a* is arranged between the base section 23*a* and the branch sections 24*a* and separates the pressure chambers 20*a* into the two branch sections 24*a*. The pump 16 is connectable to the pressure chamber 20*a* by the fitting 21*a*. A closure 25*a* is arranged at each of the ends of the branch sections 24*a* for closing the ends of the hose-shaped branch sections 24*a* distal of the splitter 22*a*.

The fitting 21*a* preferably comprises a reducer, which is not shown. The reducer comprises a connecting portion and a junction portion. The reducer is preferably made of silicone.

In the exemplary embodiment according to FIG. 3, the base sections 23*a* of the pressure chambers 20*a* run above the waist line of the person 100*a*. In a further exemplary embodiment, which is not shown, the fitting directly merges into the splitter. Preferably, the closure is thereby formed integrally with the branch sections.

The branch sections 24*a* of the corresponding pressure chambers 20*a* run each run around one of the legs of the person 100*a*. The pressure chambers 20*a* are insertable via insertion openings 35*a* into the wearable holder 30*a*.

FIG. 4 shows a wearable holder 30*a* according to the second exemplary embodiment. The wearable holder 30*a* depicted in FIG. 4 is formed as trousers and is represented as turned inside out. The wearable holder 30*a* consists of a first layer 32*a* and a second layer 33*a*. Two channels 31*a* run between the first layer 32*a* and the second layer 33*a* and serve for receiving the pressure chambers 20*a*. The first layer 32*a* and the second layer 33*a* are connected to each other by at least one seam 34*a*. The channel 31*a* is defined by the first layer 32*a*, the second layer 33*a* and the seam 34*a*.

Two channels 31*a* run substantially parallel to each other. The wearable holder 30*a* is preferably made of an elastic, textile and breathable material.

The carrier is preferably made of an elastic, textile and breathable material.

The cut-out of FIG. 4 enlarged in FIG. 4*a* shows how the pressure chambers 20*a* run along the channels 31*a*. The pressure chambers 20*a* are freely located on the outer sides of the wearable holder 30*a* turned inside out and are thus shiftable and positionable in simple manner along the entire channel. Along these places, when the wearable holder is turned back to the outside, the pressure chamber 20*a* is placed in direct contact with the body part 110*a*.

As is shown in FIG. 16, the pump 16 comprises at least one compressor 84 and a first valve 86*a* as well as a second valve 86*b*. Initially, the first valve 86*a*, which is connected with the first pressure chamber 26, is opened and the compressor 84 is operated until a prescribed pressure is reached. The pressure situated inside a first pressure chamber 26 of the pressure chamber 20*a* is maintained. Subsequently, the first valve 86*a* and the second valve 86*b* are opened so that the pressure prevailing inside the first pressure chamber 26 assimilates with the pressure prevailing inside the second pressure chamber 28 of the pressure chamber 20*a*. Subsequently, the first valve 86*a* is closed again and the second pressure chamber 28 is applied with the fluid by the pump 16. Then, the first valve 86*a* is opened again for achieving a pressure compensation between both pressure chambers 26, 28. Thereafter, the second valve 86*b* is closed again and the cycle begins again with an open first valve 86*b*. The compressor 84, as well as the valves 86*a*, 86*b*, is controlled by a controller 99.

Preferably, the first pressure chamber 26 is applied with pressure for 2 to 10 seconds. The pressure is then preferably maintained for 10 to 30 seconds. In the following step, the pressure inside the second pressure chamber 20*a* is increased for 2 to 10 seconds and maintained for 10 to 20 seconds.

Preferably, the pressure chambers 20*a* are alternatingly applied with a pressure of 0.3 bar to 0.8 bar, preferably with a pressure of 0.6 bar.

The device according to the invention in shape of trousers distinguishes itself by the following advantages.

The trousers are embodied double-layered, wherein both layers are sewn with each other in such a way that two parallel, separate channels result.

These channels spirally embrace the waist portion and the legs. The design of the hose channels is done in such a way that covers as much as possible of the legs- and buttocks-portion. The hoses can be threaded in through openings in the inner layer at the leg's outer sides and leg's inner sides that are not visible from outside. Distributional, ending and beginning pieces are inserted into hoses at the necessary places.

Strongly simplified, trousers comprise a front part and a rear part. In this case, each of these parts is double-layered, wherein both layers are sewn together with each other in such a way that two parallel, separate channels result. The seam is interrupted at a suitable point in order to make a straight threading in of the hoses also after completion of the trousers with a simple tool as possible. At the unsewn points, the hoses come out of the hose channels and have direct skin contact at these points.

The trousers contain two layers of sufficient elasticity, which are identical in terms of cut. The inner layer is sewn with the outer layer along basically rather straight lines. The so prepared cuts are sewn to trousers. Trousers with channels or paths for the hoses result. These paths provide small openings at the main seams of the cut-parts. In reversed condition, the hose can now be threaded in the paths. The openings avoid that the threading in must be done spirally, which would practically not be sensibly implementable.

Silicone hoses of thin wall strength and fitting diameter embrace the desired body parts wavy respectively spirally and a massage effect is achieved around the leg, also inside. The air chambers are reduced to a product of material sold by the meter. The silicone hose is elastic and can, above all, strongly extend axially. Thereby, an insertion into elastic trousers material becomes possible, which again relaxes the correct fit issue.

In FIG. 5 the arrangement of the piece of fitness equipment at the body part of the person 100a is shown. If now, the first pressure chamber 26 is applied with fluid by the pump 16 and air is sucked from the second pressure chamber 28 at the same time or it is not applied with pressure, portions at the body part 110 result to which pressure is applied and portions at which no pressure is applied to the body part 110a. By alternating appliance of fluid into and out of the first pressure chamber 26 and the second pressure chamber 28, the blood circulation in the body part can so be stimulated. Most different pumping cycles for the first pressure chamber 26 and the second pressure chamber 28 are contemplated, which particularly differ by the time period and frequency of the pressure appliance to the body part 110a.

FIG. 6 shows an outer side of the carrier 12. The object holder 22 is attached to the carrier 12. The object holder 22 is represented in closed conditions. The carrier 12 comprises a main body 60 that is provided with a loop tape 63, except for a middle section at the outer side. A loop tape 63 is particularly provided at a second end 62 of the main body 60. A further loop tape 63a is provided at a first end 68 and at the middle section. Hook tape 69 and loop tape 63 as well as a further loop tape 63a together form a fastener.

As can be recognized from FIG. 7, the main body 60 has a holder 64 and two straps 66 at its inner side. The hook tape 69 is provided at the first side 68 of the main body 60. The holder 64 comprises a first 70 and a second opening 72, wherein the first tube 34 and the second tube 36 can be led out of the holder 64 through the first opening 70. A switch 77 of the pump 16 can be operated through the second opening 72. The straps 66 serve for holding and leading the first 34 and the second tube 36.

The holder 64 is firmly attached to the main body 60 and formed as a pocket 74. The pocket 74 has a lock 76 for closing the pocket 74. As can be well recognized in FIG. 8, the first and the second tube 34, 36 each provide an end piece 54 in form of a plug for fittings.

As is well illustrated in FIG. 10, the object holder 18 has at its back side two hook tapes 78 at the pouch 22 by which the object holder 18 can be attached to the loop tape 63a of the main body 60.

FIGS. 12a to 12g show respective side views of the pump 16. The pump 16 has two connections 80 and a switch 77. The first 34 and the second tube 36 are connected with the connections 80. As can be well seen in FIGS. 13 and 14 the pump 16 has a battery 82 and two compressors 84, which are in fluid connection with a first valve 86a and a second valve 86b via tubes 87. The compressors 84 are connected with the connections 80 via the tubes 87 with the valves 86a, 86b opening or closing the single connections 80. Furthermore, the pump 16 provides a bottom plate 88, a damping layer 90, a circuit board 92 and a lid 94. The circuit board 92 carries the compressors 84 the battery 82 and the valves 86a and 86b, as is recognizable in FIG. 14. Therefore, brackets 93 and/or a cable tie is used. The circuit board 92 is suspended in a circumferential frame 95 of soft plastic, recognizable in FIG. 12, which itself is clamped between the base plate 88 and the lid 94. Additionally, a damping layer 90 of neoprene is laid in the base plate 88 as well as in the lid 94 for achieving a further sound damping.

As is recognizable in FIG. 14, the pump 16 further provides a sensor 96 that measures the pressure of the fluid inside the first tube 34 and inside the second tube 36. The sensor 96 is connected with the controller 99 for terminating the operation of the pump 16, if the pressure measured inside the first 34 and the second tube 36 reaches a pressure limit or the pressure limit is not reached within a prescribed time period. The controller 99 can be arranged on the circuit board 92 as a separate part. Alternatively, the controller 99 can be provided by the circuit board 92 itself. The controller 99 controls the pump 16.

As can also be recognized from FIG. 14, the pump 16 further includes a detector for detecting the state of charge 97 that measures the state of charge of the battery 82. If the state of charge of the battery 82 is below a prescribed value, a signal is given to a notifier 98, which is a speaker in the embodiment shown. This one makes a buzzing noise.

As can be seen in FIGS. 15a to 15c, a charger 100 has two ports 102 with a pump 16 being inserted into each of them. The port 102 is sloped to a horizontal so that the pump 16 cannot slip out of the port 102. The ports 102 are arranged one above the other. A counter-contact portion 104 in form of a pin is provided in the port 102, as can be seen in FIG. 15a. The counter-contact portion 104 touches a contact portion 106 of the pump 16, which is recognizable in FIGS. 12d and 12e in form of a socket. The contact portion 106 and the counter-contact portion 104 are made of metal and establish an electrical connection between a charger not shown and the battery 82 of the pump 16.

FIG. 17 illustrates the electrical connection between the single ports 102. Therefore, the port 102 provides a contact surface 105 on the lowerside and a contact peg 107 on the upper side that touch each other, if two ports 102 are stacked above each other. As particularly can be recognized in FIG. 22, the charger 100 includes a detector 108 at each of its ports 102. The detector 108 is formed as a card reader in the shown embodiment, which detects a membership card in form of a card as an ID. If a valid ID is detected, a signal is given to a retainer 109 shown in FIGS. 16a and 16b. The retainer 109 engages behind the pump 16 so that it cannot be removed from the port 102 until a signal is received from the detector 108. If the retainer 109 receives a signal from the detector 108, the pump 16 is released so that the user can remove the pump 16 from the port 102.

As can be seen in FIGS. 18a to 18p, a hanger 110 has a holding portion 112 and an attachment portion 114. The holding portion 112 is open at its top in vertical direction so that the pump 16 can be inserted into the holding portion 112 from above. The inner dimensions of the holding portion 112 are adapted to the outer dimensions of the pump 16 so that the pump 16 can be inserted into the holding portion 112 and that the pump 16 can be securely arranged.

The attachment portion 114 has a base section 116 and a contact section 118. The base section 116 and the contact section 118 form an abutting section 120. A rod 122 of an apparatus is pressed against the abutting section 120 by a fastening section 124 in form of a cable tie. Therefore, the attachment portion 114 provides holes 130, through which the fastening section 124 can be led. The abutting section 120 comprises an abutting surface 126, as can be seen in FIGS. 19 to 19c, or abutting protrusions 128, as can be seen in FIGS. 18a to 18p and 19a. The abutting protrusions 128 are formed as rubber pimples. Depending on the size of the rod 122, the abutting surface 126 or the abutting protrusions 128, serving as contact section 118 can be plugged or screwed into the base section 116. The fastening sections 124 can be led through holes 130. The holes 130 are arranged in recesses 132 of the holding portion 112 so that even a particularly thick fastening section 124 can be used.

The recesses 132 are reinforced by reinforcements 134, which can also be formed by an abutting section 120 in case of horizontally arranged rods 122. Moreover, the reinforcements 134 form an abutting section 120 for attachment to vertical rods, wherein this one is particularly suitable for rods with a large diameter. The reinforcements 134 furthermore provide openings, through which fastening sections 124 can be led for securing the hanger. By support of the holes 130 and the reinforcements 134 the fastening sections 124 can be arranged variously for adapting the attachment of the hanger 110 to the present situation. The different attachment possibilities of the fastening sections 124 are exemplified in FIGS. 18a to 18p. Furthermore, the holding portion 112 is dimensioned so that it can nondistortedly receive the pump 16.

A rack 140 is assigned to the charger 100. In the embodiment shown in FIG. 21, the rack 140 is provided by three stands 142 with each of them being able to receive the carrier 12. Therefore, the stand 142 provides horizontal rods 144 over which the carrier 12 can be laid.

List of References

| 10a | device |     | 24 | lid |
|---|---|---|---|---|
| 20a | pressure chamber | | 26 | first pressure chamber |
| 21a | fitting | | 28 | second pressure chamber |
| 22a | splitter | | 34 | first tube |
| 23a | base section | | 36 | second tube |
| 24a | branch section | | 38 | welding |
| 25a | closure | | 40 | first end portion |
| 30a | wearable holder | | 41 | hook section |
| 31a | channel | | 42 | first base section 44 |
| 32a | first layer | | | first branch section |
| 33a | second layer | | 46 | second base section |

List of References -continued

| 34a | seam | | 48 | second branch section |
|---|---|---|---|---|
| 35a | insertion opening | | 50 | second end portion |
| 100a | person | | 51 | loop portion |
| 110a | body part | | 52 | hose |
| 10 | piece of fitness equipment | | 54 | first end piece |
| | | | 56 | first connecting portion |
| 12 | carrier | | 58 | angle piece |
| 16 | pump | | 60 | main body |
| 18 | object holder | | 62 | second end |
| 20 | object | | 63 | loop tape |
| 22 | pouch | | 63a | further loop tape |
| 64 | holder | | 98 | notifier |
| 66 | strap | | 99 | controller |
| 68 | first end | | 100 | charger |
| 69 | hook tape | | 102 | port |
| 70 | first opening | | 104 | counter-contact portion |
| 72 | second opening | | 105 | contact surface |
| 74 | pocket | | 106 | contact portion |
| 76 | lock | | 107 | contact peg |
| 77 | switch | | 108 | detector |
| 78 | hook tape | | 109 | retainer |
| 80 | connection | | 110 | hanger |
| 82 | battery | | 112 | holding portion |
| 84 | compressor | | 114 | attachment portion |
| 86a | first valve | | 116 | base section |
| 86b | second valve | | 118 | contact section |
| 87 | tube | | 120 | abutting section |
| 88 | bottom plate | | 122 | rod |
| 90 | damping layer | | 124 | fastening section |
| 92 | circuit board | | 126 | abutting surfaces |
| 93 | bracket | | 128 | abutting protrusion |
| 94 | lid | | 130 | hole |
| 95 | circumferential frame | | 132 | recess |
| 96 | sensor | | 134 | reinforcement |
| 97 | detector | | 140 | rack |
| | | | 142 | stand |
| | | | 144 | horizontal rod |

The invention claimed is:

1. A piece of fitness equipment comprising:
first and second pressure chambers which can be supplied with a fluid and are suitable for wrapping around a body part of a person;
a pump that is connected with the first and second pressure chambers and is suitable for supplying the fluid to the first and second pressure chambers;
a wearable holder that is detachably connectable with the first and second pressure chambers and includes adjacent channels for holding the first and second pressure chambers to the body part with the first and second pressure chambers each being formed in the shape of a hose;
the first and second pressure chambers within the adjacent channels of the wearable holder being arranged so as to wrap spirally around the body part so that the first and second pressure chambers alternate along the body part; and
the pump being arranged for alternately supplying fluid to the first and second pressure chambers so that peak pressures in the first pressure chamber alternate with peak pressures in the second pressure chamber,
wherein each of the first and second pressure chambers includes a base section and two branch sections with a splitter connecting the base section with the two branch sections, and
wherein the wearable holder is in the form of trousers and the body part includes first and second leg portions to which the trousers are arranged to fit, and wherein one of the two branch sections of the first pressure chamber and one of the two branch sections of the second pressure chamber are arranged so as to wrap spirally around the first leg portion and the other of the two branch sections of the first pressure chamber and the other of the two branch sections of the second pressure chamber are arranged so as to wrap spirally around the second leg portion.

2. The piece of fitness equipment according to claim 1, wherein each of the first and second pressure chambers has an approximately circular cross-section.

3. The piece of fitness equipment according to claim 1, wherein each of the first and second pressure chambers is made of silicone.

4. The piece of fitness equipment according to claim 1, wherein each of the first and second pressure chambers includes a fitting for connecting the pump to the first and second pressure chambers.

5. The piece of fitness equipment according to claim 1, wherein each of the first and second pressure chambers includes at least one closure for closing an end of each of the first and second pressure chambers.

6. The piece of fitness equipment according to claim 1, wherein a diameter of at least one of the base section and the two branch sections is between 10 mm and 40 mm.

7. The piece of fitness equipment according to claim 1, wherein a wall thickness of at least one of the base section and the two branch sections is between 0.1 mm and 2 mm.

8. The piece of fitness equipment according to claim 1, wherein the wearable holder is made of an elastic material.

9. The piece of fitness equipment according to claim 1, wherein the wearable holder is made of a textile comprising a breathable material.

10. The piece of fitness equipment according to claim 1, wherein the wearable holder includes at least one opening through which the first and second pressure chambers are insertable into the adjacent channels.

11. The piece of fitness equipment according to claim 9, wherein the wearable holder includes a first layer and a second layer made of a textile material.

12. The piece of fitness equipment according to claim 11, wherein the adjacent channels are separated by a seam connecting the first layer and the second layer with each other.

* * * * *